US010940777B2

(12) United States Patent
Van Zyl et al.

(10) Patent No.: US 10,940,777 B2
(45) Date of Patent: Mar. 9, 2021

(54) SEAT SYSTEMS FOR EMERGENCY VEHICLES

(71) Applicant: Seats Incorporated, Reedsburg, WI (US)

(72) Inventors: Pieter Van Zyl, La Valle, WI (US); Joe Brey, La Valle, WI (US); Ryan Downing, Baraboo, WI (US); Kerry Bauer, Reedsburg, WI (US); Doug Hahn, Hillsboro, WI (US); Jesse Boyarski, Richland Center, WI (US); Laine Greenwood, Reedsburg, WI (US); Katie Kleinschmidt, Lyndon Station, WI (US)

(73) Assignee: Seats Incorporated, Reedsburg, WI (US)

( * ) Notice: Subject to any disclaimer, the term of this patent is extended or adjusted under 35 U.S.C. 154(b) by 0 days.

(21) Appl. No.: 16/379,241

(22) Filed: Apr. 9, 2019

(65) Prior Publication Data
US 2019/0308528 A1 Oct. 10, 2019

Related U.S. Application Data

(60) Provisional application No. 62/654,905, filed on Apr. 9, 2018.

(51) Int. Cl.
*B60N 2/24* (2006.01)
*B60N 2/809* (2018.01)
(Continued)

(52) U.S. Cl.
CPC ............... *B60N 2/24* (2013.01); *A62B 9/04* (2013.01); *B60N 2/0806* (2013.01); *B60N 2/22* (2013.01);
(Continued)

(58) Field of Classification Search
CPC .......... B60N 2/24; B60N 2/809; B60N 2/986; B60N 2/919; B60N 2/0806; B60N 2/22;
(Continued)

(56) References Cited

U.S. PATENT DOCUMENTS 3,971,591 A * 7/1976 Ziaylek .................... A47C 7/40
297/188.04
4,213,594 A 7/1980 Pietsch
(Continued)

FOREIGN PATENT DOCUMENTS

| JP | S5639928 A | 4/1981 |
| JP | 2017124787 A | 7/2017 |
| KR | 200293214 Y1 | 10/2002 |

OTHER PUBLICATIONS

Partial European Search Report for European Application No. 19168286.3 dated Jul. 23, 2019 (11 pages).

*Primary Examiner* — Mark R Wendell
(74) *Attorney, Agent, or Firm* — Quarles & Brady LLP

(57) ABSTRACT

A seat assembly for an emergency vehicle can include an adjustable base seat and backrest, a tank support assembly configured to selectively secure tanks of different sizes, and a tank clamp assembly configured to selectively secure tanks having bottom tank ends of different configurations. Slidably adjusting the base seat can cause adjustment of a recline angle of the backrest. One or more pads on the seat can be removable. The tank support assembly can include first and second tank securements and a locking member configured to rotate to selectively dispose the first or second tank securement to secure a tank. The tank clamp assembly can include a fixed foot clamp, a movable foot clamp, and an adjustment device configured to slide the movable foot clamp to selectively clamp the bottom tank ends of different sizes between the movable foot clamp and the fixed foot clamp.

20 Claims, 39 Drawing Sheets

(51) Int. Cl.
  *B60N 2/08* (2006.01)
  *B60N 2/22* (2006.01)
  *B60N 2/64* (2006.01)
  *B60N 2/70* (2006.01)
  *B60R 11/00* (2006.01)
  *B60N 2/90* (2018.01)
  *F17C 13/08* (2006.01)
  *A62B 9/04* (2006.01)

(52) U.S. Cl.
  CPC .......... *B60N 2/2209* (2013.01); *B60N 2/643* (2013.01); *B60N 2/646* (2013.01); *B60N 2/7005* (2013.01); *B60N 2/809* (2018.02); *B60N 2/919* (2018.02); *B60N 2/986* (2018.02); *B60R 11/00* (2013.01); *F17C 13/084* (2013.01); *B60N 2002/2204* (2013.01); *B60R 2011/0015* (2013.01)

(58) Field of Classification Search
  CPC ...... B60N 2/2209; B60N 2/643; B60N 2/646; B60N 2/7005; B60N 2002/2204; A62B 9/04; B60R 11/00; B60R 2011/0015; F17C 13/084
  USPC .................................................... 297/188.04
  See application file for complete search history.

(56) References Cited

U.S. PATENT DOCUMENTS

| | | | |
|---|---|---|---|
| 4,461,444 A | 7/1984 | Grassl | |
| 4,586,687 A * | 5/1986 | Ziaylek, Jr. | A62B 9/04 169/51 |
| 4,946,145 A | 8/1990 | Kurabe | |
| 5,213,392 A * | 5/1993 | Bostrom | A62B 25/00 297/188.04 |
| 5,275,462 A * | 1/1994 | Pond | A62B 9/04 297/188.04 |
| 5,681,080 A * | 10/1997 | Pond | A62B 25/00 297/188.04 |
| 5,934,749 A | 8/1999 | Pond et al. | |
| 6,119,727 A | 9/2000 | Morris | |
| 6,220,557 B1 * | 4/2001 | Ziaylek | A62C 13/78 248/154 |
| 6,702,242 B1 * | 3/2004 | Ziaylek, Jr. | B60N 2/24 248/154 |
| 6,796,515 B2 | 9/2004 | Heren | |
| 6,883,766 B1 * | 4/2005 | Ziaylek | A62B 9/04 248/154 |
| 6,926,243 B1 * | 8/2005 | Ziaylek | A62B 25/00 248/307 |
| 7,922,246 B2 * | 4/2011 | Gale | B60R 11/00 248/313 |
| 7,963,597 B2 * | 6/2011 | Bostrom | A62B 9/04 297/188.04 |
| 7,975,978 B2 * | 7/2011 | Ziaylek | B60R 7/043 248/311.3 |
| 8,052,209 B2 * | 11/2011 | Bostrom | A62C 13/78 297/188.04 |
| 8,152,123 B2 * | 4/2012 | Ziaylek | A62B 9/04 248/311.2 |
| 8,191,848 B2 * | 6/2012 | McLoughlin | A62B 25/00 248/313 |
| 8,622,469 B2 * | 1/2014 | Hogg | B60R 11/00 297/188.04 |
| 9,381,829 B2 | 7/2016 | Lee | |
| 2003/0038525 A1 * | 2/2003 | Pond | B60N 2/24 297/452.29 |
| 2003/0047971 A1 * | 3/2003 | Fohrenkamm | B60N 2/646 297/188.04 |
| 2009/0045657 A1 * | 2/2009 | Bostrom | A62B 25/00 297/188.04 |
| 2009/0050220 A1 | 2/2009 | Kang | |
| 2009/0096268 A1 | 4/2009 | Stephens | |
| 2009/0250582 A1 * | 10/2009 | Ziaylek | A62B 25/00 248/312 |
| 2012/0139304 A1 | 6/2012 | Jang | |
| 2017/0259715 A1 * | 9/2017 | Heo | B60N 2/0228 |

* cited by examiner

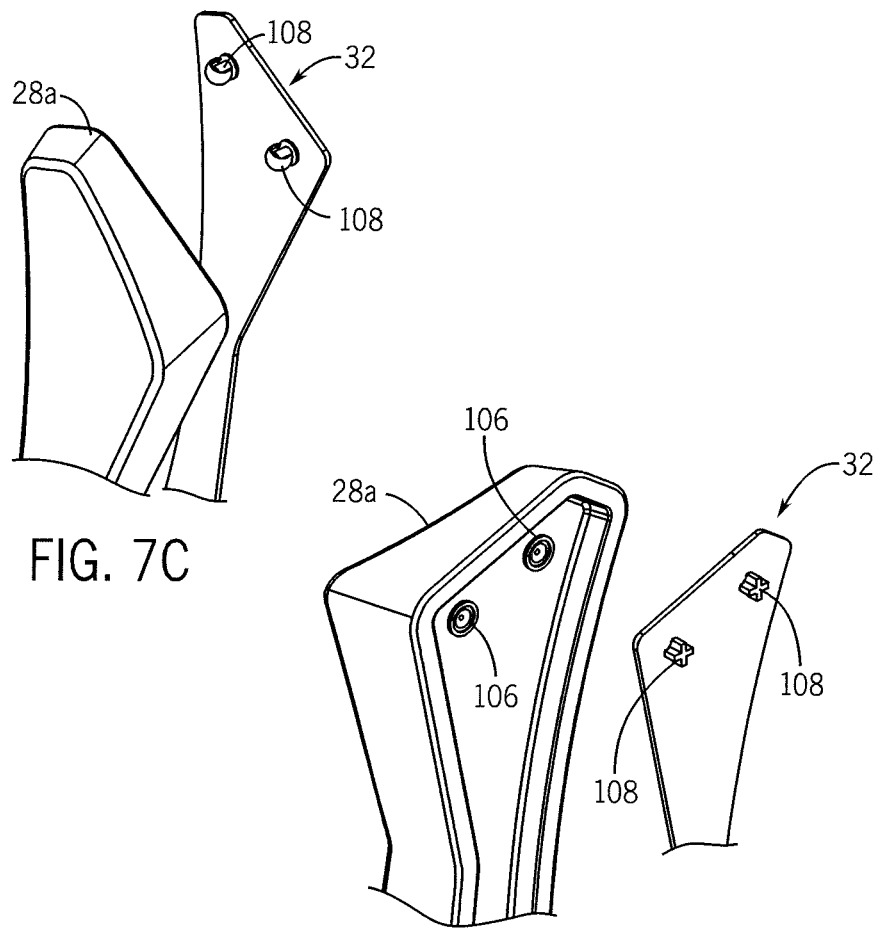
FIG. 7C
FIG. 7D
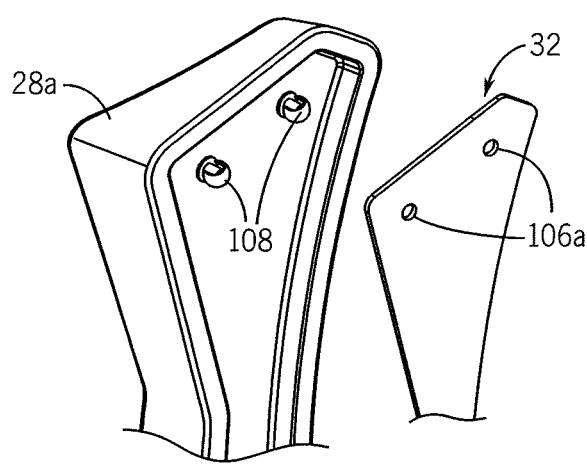
FIG. 7E

SEAT SYSTEMS FOR EMERGENCY VEHICLES

CROSS-REFERENCE TO RELATED APPLICATIONS

This application claims priority to U.S. Provisional Patent Application No. 62/654,905, titled "Seat Systems for Emergency Vehicles" and filed on Apr. 9, 2018, the entirety of which is incorporated herein by reference.

BACKGROUND

Firetrucks and other emergency vehicles are frequently used to transport firefighters, emergency medical technicians, and other first responders to the scene of a fire or other incident. Using an emergency vehicle, one or more emergency or rescue personnel can be quickly transported to the scene of an incident, where they can perform various appropriate tasks.

Due to the time-sensitivity typically associated with emergency response, personnel being transferred to the scene of an incident often equip themselves with safety equipment or other tools before entering the relevant vehicle. For example, a firefighter may need to ride to the scene of an emergency wearing a flame-retardant or flame-resistant suit, a helmet, and various tools, with a self-contained breathing apparatus ("SCBA") in place to be quickly strapped to his or her back. Such safety equipment and other tools can be difficult or uncomfortable to wear while seated in a conventional vehicle seat. Additionally, the safety equipment can make it difficult to appropriately restrain personnel (e.g., with a seatbelt) in a conventional vehicle seat.

SUMMARY

Some embodiments of the invention provide an improved seat system for use in an emergency vehicle. Embodiments of the seat system can generally include tool-free removable pads and adjustable seat components, and can be used to support and secure SCBA tanks of many different sizes. In some embodiments, different subsystems within the seat assembly can help emergency personnel to comfortably ride in, and quickly and safely exit, a seat.

Some embodiments of the invention provide a seat assembly for a cab of an emergency vehicle. A frame can be configured to be secured within the cab of the emergency vehicle. A base seat can be supported relative to the frame by a seat support structure. A backrest can be supported relative to the frame by a back support structure. The seat support structure can be slidable relative to the frame to adjust the base seat. The back support structure can be configured to rotate relative to the frame, to adjust a recline angle of the backrest, as the seat support structure is slid relative to the frame to adjust the base seat.

Some embodiments of the invention provide a seat assembly for a cab of an emergency vehicle, for use with a frame that is configured to be secured within the cab of the emergency vehicle. A seat support structure can be coupled to the frame through a slidable base arrangement. A back support structure can be coupled to the frame and the seat support structure. The slidable base arrangement can have a catch mechanism configured to allow selective retention of the seat support structure to the frame. The back support structure can be configured to be rotated relative to the frame by the seat support structure as the seat support structure is slid relative to the frame.

Some embodiments of the invention provide a seat assembly for a cab of an emergency vehicle configured to retain a Self-Contained Breathing Apparatus (SCBA) tank. A frame can be configured to be secured within the cab of the emergency vehicle. A base seat can be supported relative to the frame by a seat support structure. A backrest can be supported relative to the frame by a back support structure, the backrest including a first side cushion and a second side cushion removable from the back support structure without the use of tools and defining a gap therebetween sized to accommodate the SCBA tank. An actuator can be coupled to the seat support structure and the frame, and can be configured to releasably secure the seat support structure to the frame. A headrest assembly can include a headrest and can be configured to be secured to the frame. A tank support assembly can include a first tank securement and a second tank securement configured, respectively, to separately engage SCBA tanks of a first size and a second size.

The tank support assembly can be configured to be selectively rotated to a first orientation and a second orientation. The seat support structure can be slidable relative to the frame to adjust the base seat. The seat support structure can be configured to slide and rotate the back support structure relative to the frame, to adjust a recline angle of the backrest, as the seat support structure is slid relative to the frame to adjust the base seat. The headrest assembly can be configured to selectively secure the headrest at a plurality of heights relative to the frame and to pivotally support the headrest for movement of the headrest to a plurality of angular orientations. The first orientation of the tank support assembly can dispose the first tank securement to secure the SCBA tank of the first size to the frame. The second orientation of the tank support assembly can dispose the second tank securement to secure the SCBA tank of the second size to the frame.

Some embodiments of the invention provide a seat assembly for a cab of an emergency vehicle, for use with a frame that is configured to be secured within the cab of the emergency vehicle. A cushion assembly can include at least one of a base seat, a headrest cushion, or a side cushion. The cushion assembly can be configured to be secured to and removed from the frame without the use of tools.

Some embodiments of the invention provide a seat assembly for a cab of an emergency vehicle, for use with a frame that is configured to be secured within the cab of the emergency vehicle. A headrest assembly can support a headrest and can be configured to be secured to the frame. The headrest assembly can be configured to selectively secure the headrest at a plurality of heights relative to the frame and to pivotally support the headrest for movement of the headrest to a plurality of angular orientations.

Some embodiments of the invention provide a tank support assembly for selectively securing tanks of different sizes to a frame of a seat assembly of an emergency vehicle. A first tank securement can be configured to engage a tank of a first size. A second tank securement can be configured to engage a tank of a second size different from the first size. A locking member can be secured to the first and second tank securements and rotatably secured to the frame of the seat assembly. The locking member can be configured to be selectively rotated to selectively rotate the tank support assembly to a first orientation and a second orientation. The first orientation of the tank support assembly can dispose the first tank securement to secure the tank of the first size to the frame. The second orientation of the tank support assembly can dispose the second tank securement to secure the tank of the second size to the frame.

Some embodiments of the invention provide a tank support assembly for selectively securing tanks of different sizes to a frame of a seat assembly of an emergency vehicle, in cooperation with one or more tank securements. A height adjustment assembly can be configured to adjust a height of the one or more tank securements relative to the frame of the seat assembly without the use of tools.

Some embodiments of the invention provide a tank clamp assembly for selectively securing tanks having bottom tank ends of different sizes to a frame of a seat assembly of an emergency vehicle. A fixed foot clamp can be secured to a base plate. A movable foot clamp can be slidably secured to the base plate. An adjustment device can be configured to slide the movable foot clamp relative to the base plate to selectively clamp the bottom tank ends of different sizes between the movable foot clamp and the fixed foot clamp.

Some embodiments of the invention provide an assembly for a cab of an emergency vehicle, with the assembly including two or more of: a seat assembly with an adjustable base seat and backrest; a seat assembly with a cushion assembly that can be secured to and removed from a frame without the use of tools; a seat assembly with a headrest assembly that is configured to selectively secure a pivoting headrest at a plurality of heights relative to a frame; a tank support assembly configured to selectively engage tanks of different sizes; a tanks support assembly that includes a tool-less height adjustment assembly; and a tank clamp assembly configured to selectively engage tank bottom ends of different configurations.

These and other features of the present disclosure will become more apparent from the following description of the illustrative embodiments.

DESCRIPTION OF THE DRAWINGS

FIGS. 7C and 7D are isometric views of the coupling of FIGS. 7A and 7B in an example installation for the emergency seat assembly of FIG. 1A.

FIG. 7E is an isometric view of another coupling in an example installation for the emergency seat assembly of FIG. 1A.

Figure 1A:
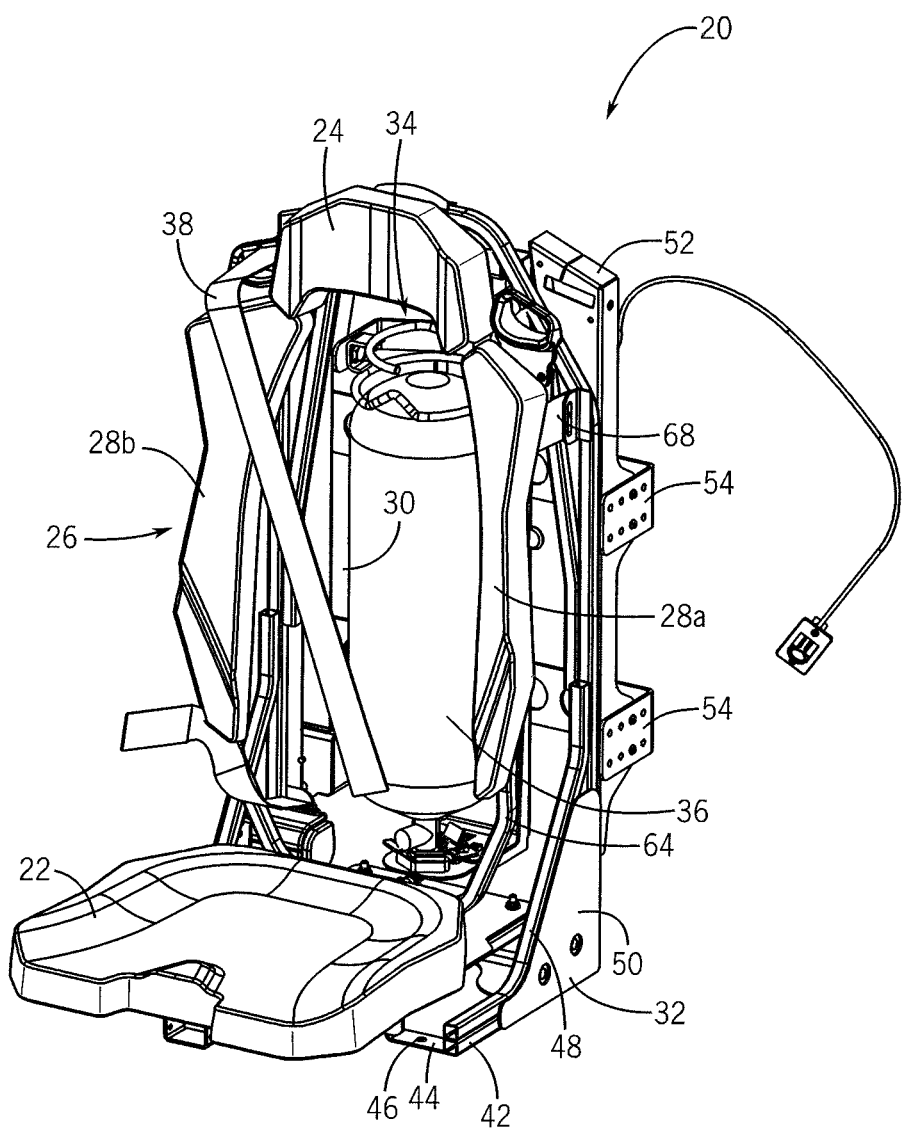
FIG. 1A is a front isometric view of an emergency seat assembly according to an embodiment of the invention.

Corresponding reference characters indicate corresponding parts throughout the several views. Although the drawings represent embodiments of the present disclosure, the drawings are not necessarily to scale and certain features may be exaggerated in order to better illustrate and explain the embodiments of the present disclosure.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As alluded to above, design considerations for seats for emergency vehicles can include comfort and safety of personnel as well as appropriate accommodation for equipment such as SCBA tanks. Embodiments of the invention can provide improved seats for emergency vehicles that can address these and other considerations. For example, some embodiments of the invention can provide seats that are readily adjustable with regard to forward/rearward positioning of a base seat and recline angle of a backrest, including through a single operator-actuated adjustment. As another example, some embodiments can include support assemblies for SCBA tanks that can reliably and adaptably secure tanks of a variety of sizes, while allowing relatively quick installation of the tanks and relatively quick egress of emergency personnel wearing the tanks. As still another example, some embodiments can include adjustable headrests that can allow for appropriate sliding adjustments for comfort and safety while also readily pivoting to allow convenient and rapid egress from the seat. As still another example, some embodiments can include seat pads that can be quickly and easily installed and uninstalled without the use of tools. Further, in some embodiments, one or more of the sub-systems noted above (or others) can be utilized in a single seat assembly.

Figure 1B:
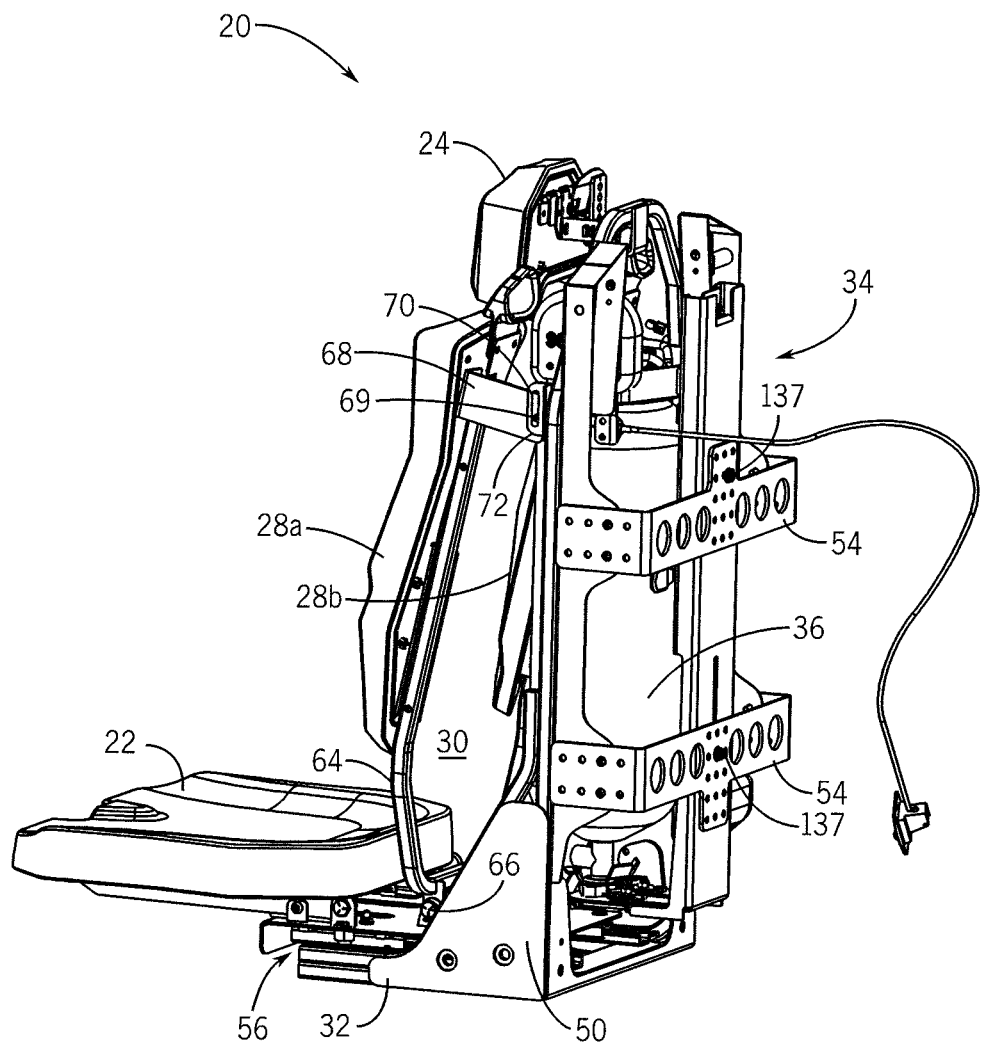
FIG. 1B is a rear isometric view of the emergency seat assembly of FIG. 1A.
Figure 2:
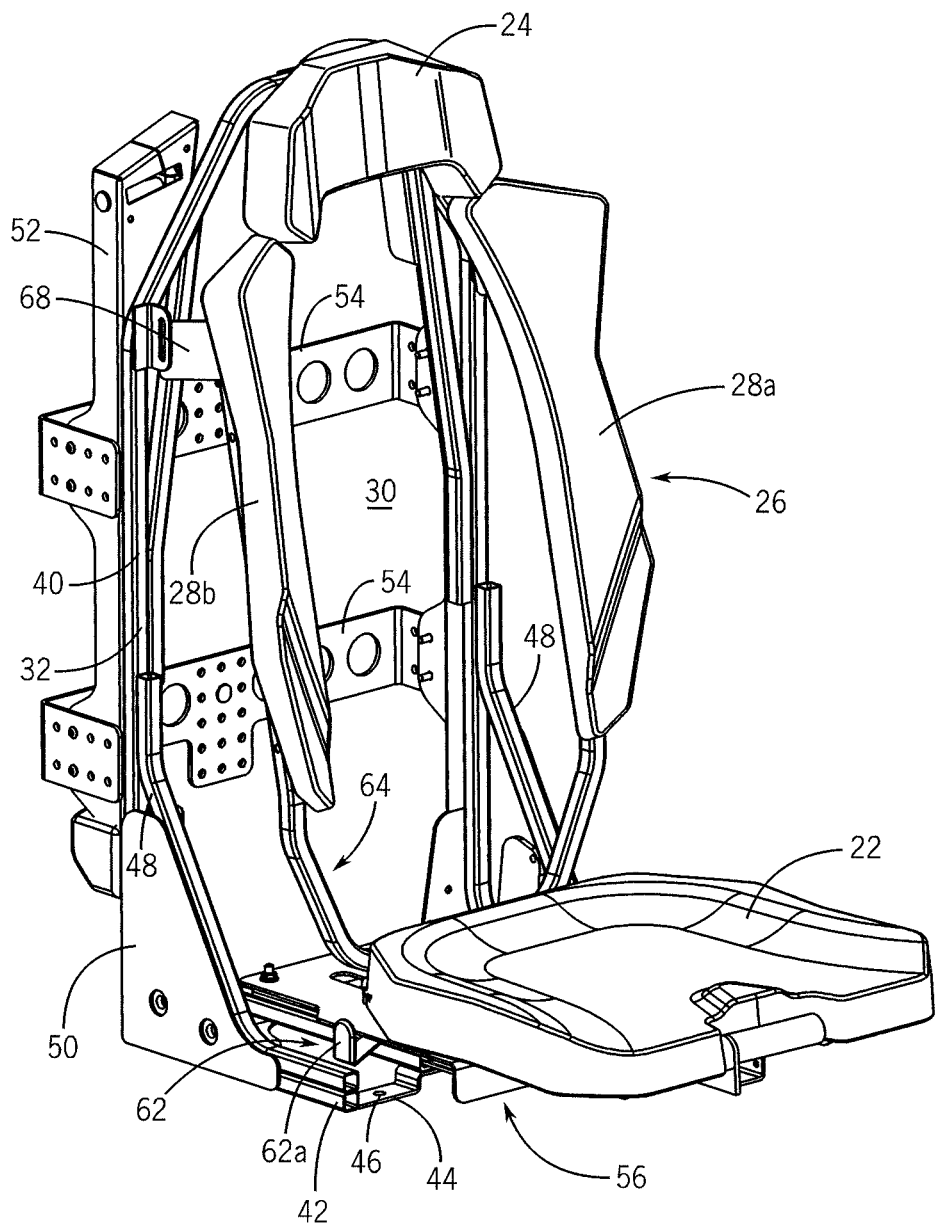
FIG. 2 is a front isometric view of certain seating components of the emergency seat assembly of FIG. 1A.
Figure 3A:
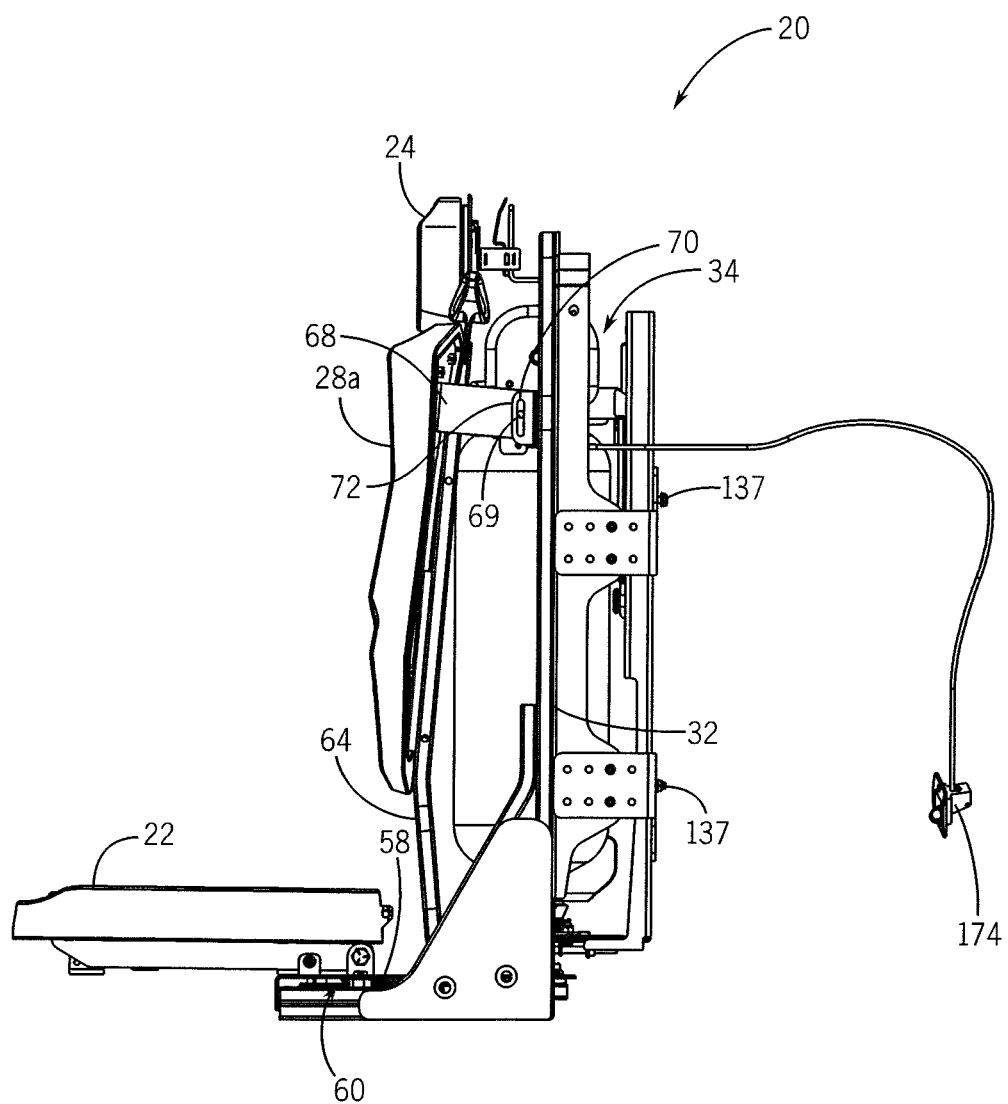
FIG. 3A is a side elevation view of the emergency seat assembly of FIG. 1A with a backrest in an upright position.
Figure 3B:
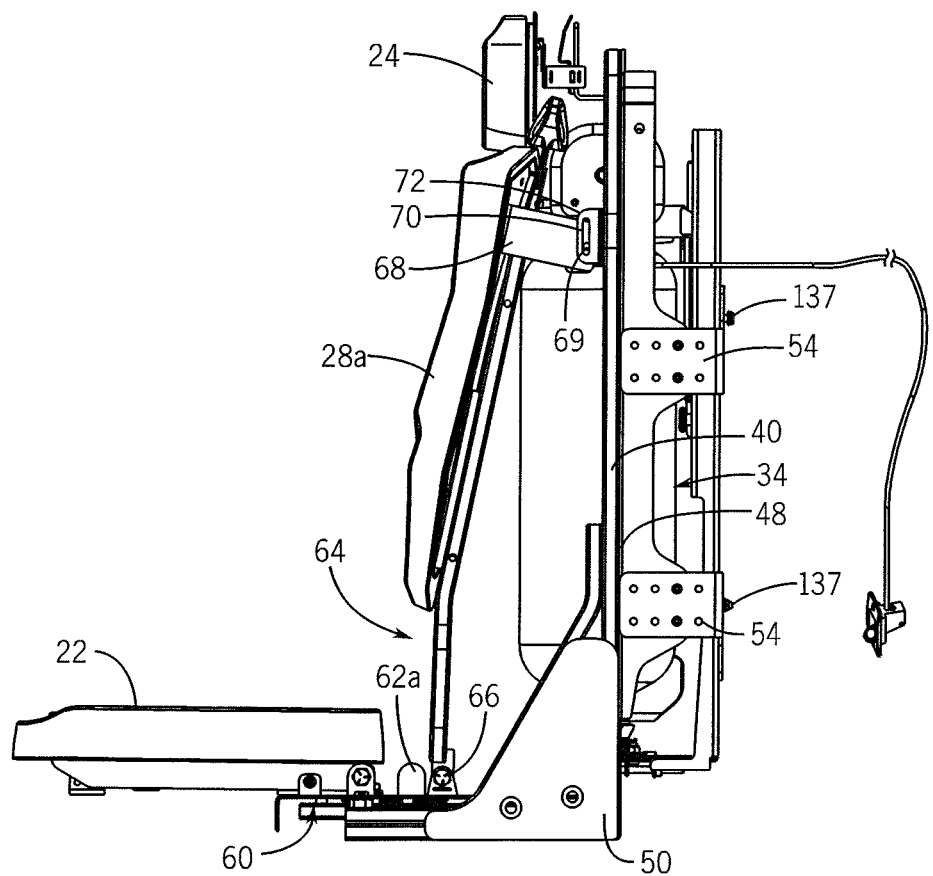
FIG. 3B is a side elevation view of the emergency seat assembly FIG. 3A with the backrest in a reclined position.
Figure 3C:
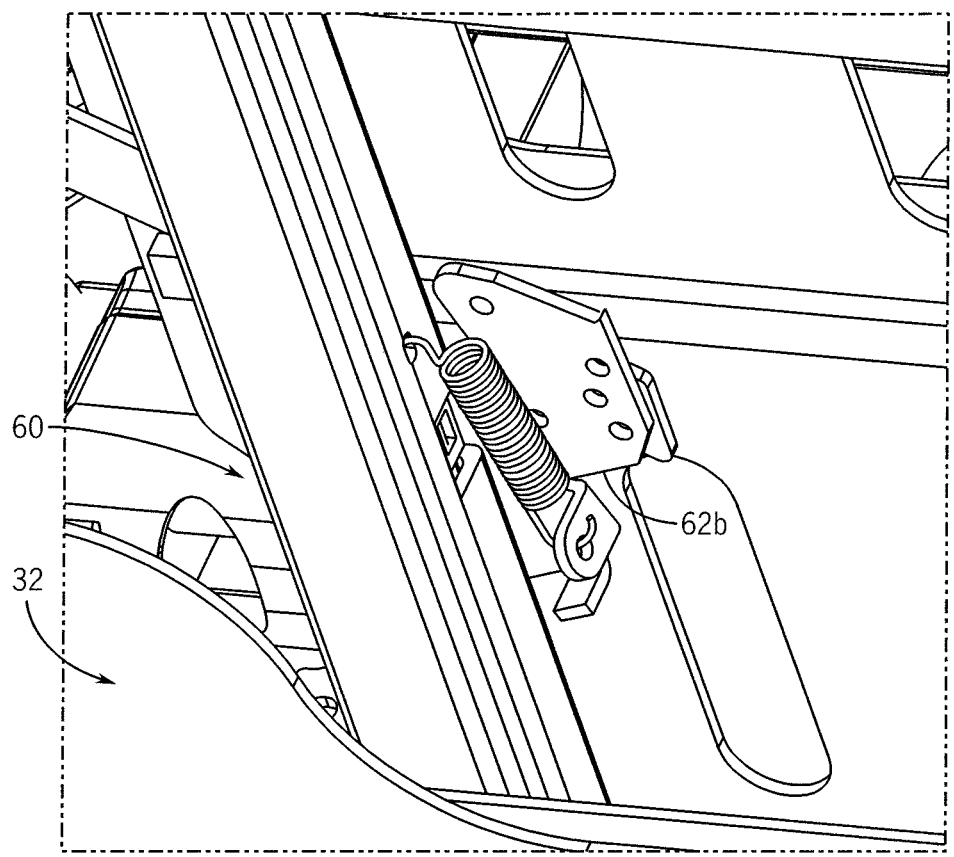
FIG. 3C is bottom isometric view of an actuation mechanism for adjusting the emergency seat assembly of FIG. 1A.

FIGS. 1A and 1B illustrate an example emergency seat assembly 20 according to one embodiment of the invention. The emergency seat assembly 20 includes a base seat 22, a headrest 24, and a backrest 26 that includes a set of side cushions 28a, 28b. In the embodiment illustrated, the side cushions 28a, 28b are spaced apart and partially define a gap 30 through which equipment like an SCBA tank 36 can extend. The base seat 22, headrest 24, and side cushions 28a, 28b are generally supported by a frame 32 that can, for example, be mounted to a floor or other surface of an emergency vehicle. A tank support assembly 34 is coupled to the frame 32 to support and secure SCBA tanks of different sizes, such as the SCBA tank 36, within the emergency seat assembly 20. A restraint 38, such as a seatbelt, extends from one side of the frame 32 to the other to secure a passenger in place.

FIGS. 1A through 3B in particular illustrate certain aspects of the structure of the frame 32. The frame 32 can be formed of aluminum or steel, for example, to appropriately support emergency personnel along with the equipment they may carry. In some embodiments, aluminum plates and tubing can be bent into appropriate shapes to form the frame 32. In other embodiments, other materials or construction techniques can be used.

In the embodiment illustrated, the frame 32 includes a rear support 40 and legs 42 extending away from the rear support 40 to generally assist in supporting the emergency seat assembly 20. Mounting plates 44 extend away from the legs 42, and provide through-holes 46 that can receive fasteners or other coupling devices (not shown) to secure the emergency seat assembly 20 to the floor of an emergency vehicle. Reinforcing members 48 extend between the legs 42 and the rear support 40 to provide additional structural strength to the frame 32. In some embodiments, the reinforcing members 48 can be rigidly coupled (e.g., by welding) to both the legs 42 and the rear support 40. Reinforcing plates 50 are coupled to the legs 42 and the rear support 40 to further support and reinforce the frame 32. Restraint supports 52 can extend vertically from the rear support 40 of the frame to support the restraint 38. In other embodiments, other support configurations are also possible.

Also in the example shown, in order to adjustably secure the tank support assembly 34, one or more braces 54 are configured to extend between opposite sides of the rear support 40 of the frame 32. The braces 54 can provide additional support to the frame 32, as well as adjustability, via the various fastener openings in the braces 54, with regard to the mounting location of the tank support assembly 34 relative to the frame 32. This may be useful, for example, in order to allow the seat assembly 20 to fit within vehicle cabs with a variety of configurations.

In some embodiments, it may be useful to allow a seat assembly to be adjusted. For example, it may be useful to allow for the base seat 22 to move forward or backwards or for the backrest 26 to exhibit varying degrees of recline in order to improve the comfort of riders, including while a tank is secured within the seat assembly 20. In some embodiments, to facilitate these types of adjustment, the base seat 22 sits upon an adjustable support assembly 56. The support assembly 56 can be coupled to the mounting plates 44 or other parts of the frame 32, and can allow forward and rearward motion of the base seat 22 relative to the frame 32, as partially shown in FIGS. 3A and 3B.

Seats according to embodiments of the invention can be configured to be slidably or otherwise adjusted in different ways. In the embodiment illustrated, for example, the support assembly 56 includes a top plate 58 that supports the base seat 22 and is slidably coupled to the base of the frame 32 by a slidable rail arrangement 60 (see e.g., FIG. 3C). To facilitate sliding adjustment of the base seat 22, an actuator 62 includes a handle 62a (see FIG. 2) and a spring-biased catch mechanism 62b (see FIG. 3C) that engages the rail arrangement 60. The actuator handle 62a can be moved (e.g., manually pivoted or translated) to selectively engage or disengage the catch mechanism 62b and thereby selectively permit translational motion of the top plate 58 and the base seat 22 relative to the frame 32.

In some embodiments, a support assembly can be further configured to cause simultaneously pivoting of a backrest so that a user can adjust a recline angle of an emergency seat assembly simultaneously with a sliding adjustment of a base seat. In some embodiments, a support assembly can be configured to cause adjustment of a recline angle based solely on sliding adjustment of a base seat. For example, in the embodiment illustrated, a back support structure 64 is pivotally coupled to the top plate 58 of the support assembly 56 at a set of pivots 66. The back support structure 64 is also slidably and pivotally secured to the rear support 40 via a set of arms 68 in pinned engagement (e.g., using the pins 69) with a set of slots 70 on tabs 72 that extend from the rear support 40. Because the back support structure 64 is pivotally coupled to the top plate 58 of the support assembly 56, and pivotally and slidably coupled to the frame 32 (i.e., at the tabs 72), translation of the top plate 58 (e.g., forward or rearward movement, from the perspective FIGS. 3A and 3B) to slidably adjust the base seat 22 simultaneously changes the recline angle of the back support structure 64 (and the attached side cushions 28a, 28b) relative to the base seat 22 and the frame 32.

In some embodiments, the back support structure 64 is substantially U-shaped, with upward-extending support portions that respectively support the side cushions 28a, 28b. In other embodiments, other configurations are possible.

Figure 4:
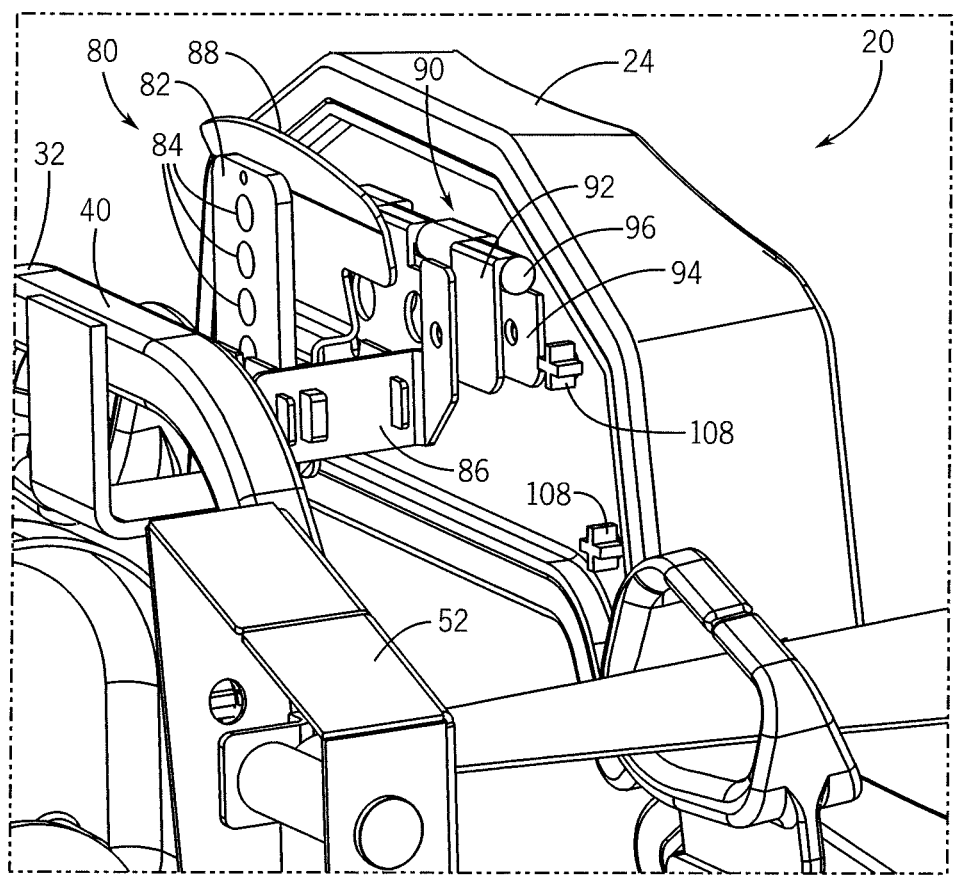
FIG. 4 is an enlarged isometric view of a headrest assembly for the emergency seat of FIG. 2.

As shown in FIG. 4 in particular, the emergency seat assembly 20 also includes an adjustable headrest assembly 80. In general, the adjustable headrest assembly 80 can be coupled to the rear support 40 of the frame 32, and can allow vertical and rotational adjustment of the headrest 24 relative to the frame 32. In the embodiment illustrated, the adjustable headrest assembly 80 includes a vertical plate 82 coupled to the frame 32, with a plurality of holes 84 that extend through the plate 82. A mounting structure 86 is slidably secured around to the vertical plate 82, and supports both the headrest 24 and an actuator tab 88 for height adjustment of the headrest 24, as also discussed below. In other embodiments, however, other configurations are possible.

To allow for pivoting movement of the headrest 24, the mounting structure 86 is coupled to a hinge 90 that is mounted to the headrest 24. The hinge 90 includes a stationary plate 92 coupled to the mounting structure 86 and a rotating plate 94 configured to rotate about a hinge pin 96 upwardly and outwardly away from the stationary plate 92. In some cases, this outward rotation enabled by the hinge 90 can be useful when rescue personnel, upon exiting the seat assembly 20, inadvertently cause the top of the SCBA tank 36 (see, e.g., FIG. 1B) to contact the headrest 24. In such an event (or at other times), the hinge 90 can allow the adjustable headrest assembly 80 to rotate freely outward, thereby letting the SCBA tank 36 pass without excessively impeding the movement of the relevant individual.

Figure 5A:
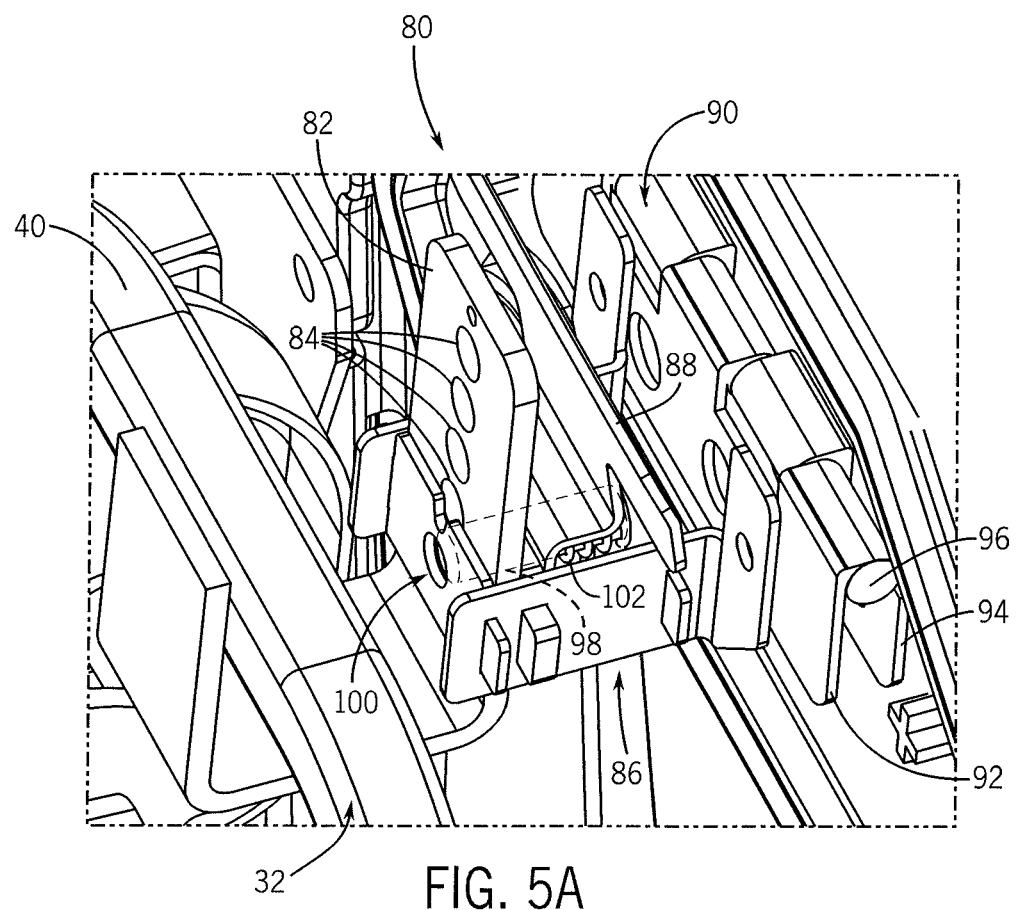
FIGS. 5A and 5B are enlarged isometric partial views of the headrest assembly of FIG. 4, including an adjustment mechanism for the headrest assembly.
Figure 5B:
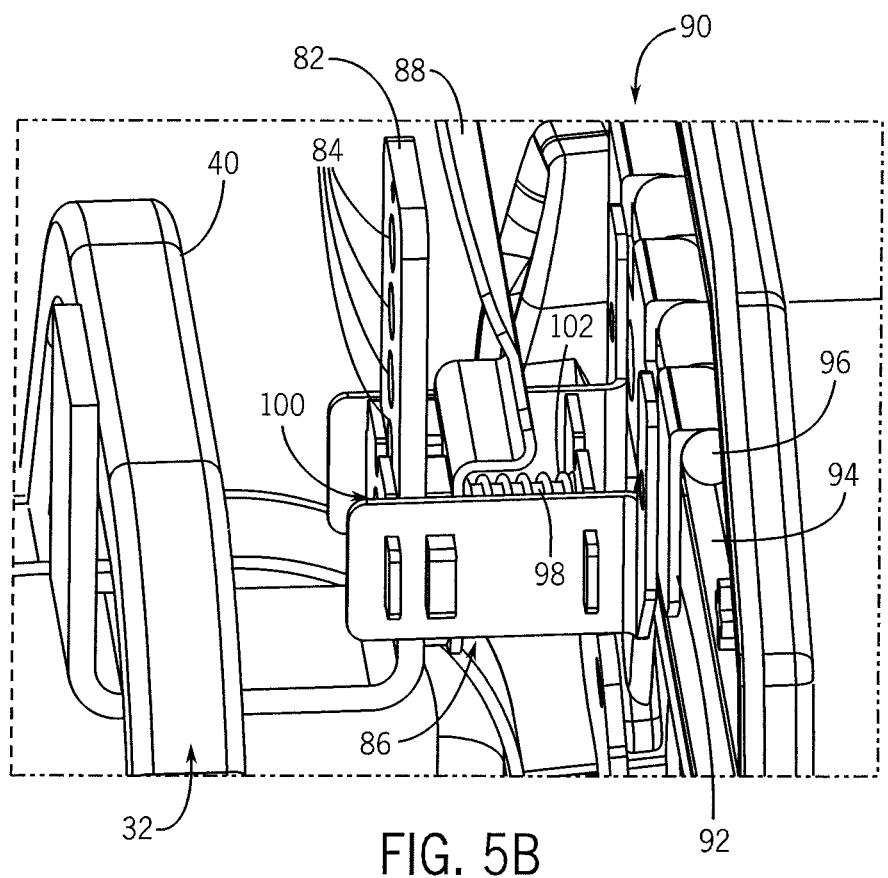

An example height adjustment mechanism of the adjustable headrest assembly 80 is shown in FIGS. 4 through 5B in particular. In the embodiment illustrated, the actuator tab 88 is coupled to a spring-loaded pin 98 that is configured to be removably received within any one of the holes 84 in the vertical plate 82 and to be simultaneously and slidably received in a set of one or more holes 100 through one or more plates of the mounting structure 86. A spring 102 (see FIG. 5) is engaged with the pin 98 and, for example, seated against a plate of the mounting structure 86, in order to bias the pin 98 into engagement with the relevant holes 84, 100.

Thus arranged, the pin 98 is generally biased to engage the plate 82 (at one of the holes 84) and the mounting structure 86 to secure the headrest 24 at a particular height relative to the plate 82. Further, as illustrated in FIG. 5B, by rotating the actuator tab 88, the pin 98 can be temporarily removed from the hole 84, as well as one or more of the holes 100, which would otherwise restrict vertical movement of the adjustable headrest assembly 80. Without the pin 98 engaging the holes 84, 100 to constrain movement of the headrest 24, the adjustable headrest assembly 80 can then be adjusted vertically along the vertical plate 82, until the pin 98 is aligned with a different one of the holes 84 at a desired height. The actuator tab 88 can then be released to allow the spring 102 to urge the pin 98 back through the relevant holes 84, 100 and thereby to lock the adjustable headrest assembly 80 and the headrest 24 at the desired height.

In some embodiments, the emergency seat assembly 20 includes removable pads. For example, the base seat 22, headrest 24, and side cushions 28a, 28b (see, e.g., FIGS. 1A through 3B) can all be removably coupled to the frame 32, or to one or more combinations of the frame 32, the back support structure 64, the headrest assembly 80, and the support assembly 56. This may allow the pads to be easily removed for cleaning after each use, which can reduce the risk of exposure to contaminants (e.g., asbestos, oil, etc.) that may have been brought into the vehicle during operation. In some embodiments, the removable pads can be made of a standard foam, and can be covered in vinyl or other material. In some embodiments, the pads can be formed of a skinned material.

Figure 6:
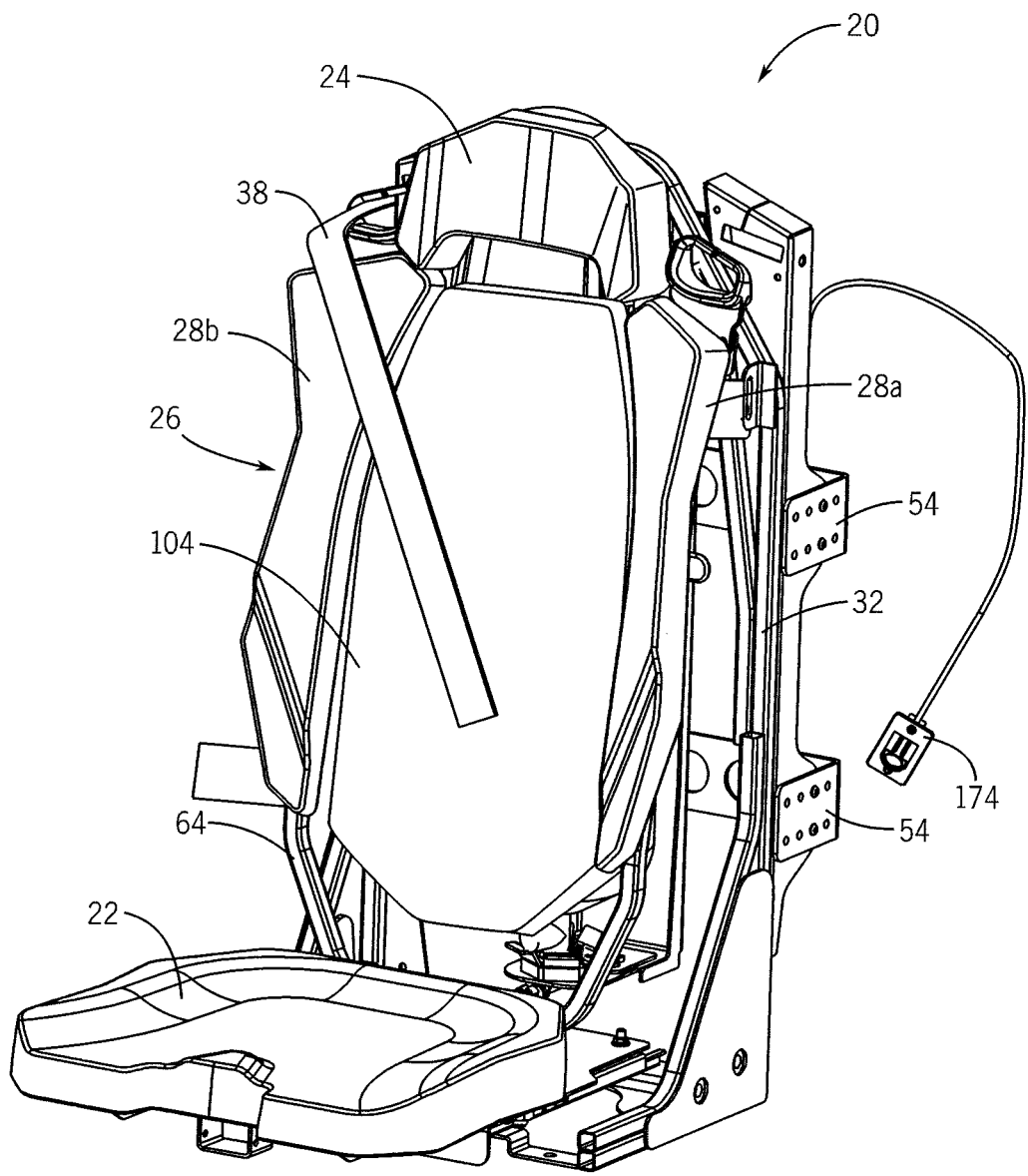
FIG. 6 is an isometric view of the emergency seat assembly of FIG. 1A with a seat pad assembly according to an embodiment of the invention.

As shown in FIG. 6, in some embodiments, an optional parade seat 104 can be removably received by the frame 32. The parade seat 104 can be used, for example, in situations where emergency personnel are not carrying or do not need to carry an SCBA tank 36 (see e.g., FIG. 3A). For example, many firetrucks or other vehicles that have emergency seat assemblies 20 are frequently driven in parades or otherwise showcased to the community. The parade seat 104 can be used during these times, which may be more comfortable for a rider that is not carrying additional equipment. Further, the easy removability of seat pads of the assembly 20 (e.g., as also discussed below) can allow for relatively easy transition between certain seat designs for display and other seat designs for functional operation.

In some embodiments, it may be useful to configure pads of the emergency seat assembly 20 to be removable without requiring the use of tools. For example, coupling features for tool-free engagement and disengagement can be formed in or secured to (e.g., embedded in) one or more parts of the seat assembly to allow tool-free attachment of pads to a relevant frame.

Figure 7A:
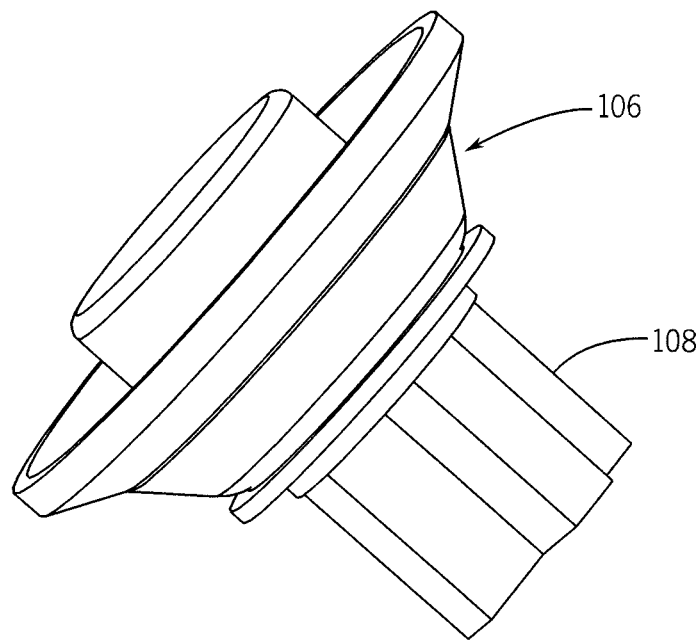
FIG. 7A is an isometric view of a coupling that can be used to removably secure pads to the emergency seat assembly of FIG. 1A.
Figure 7B:
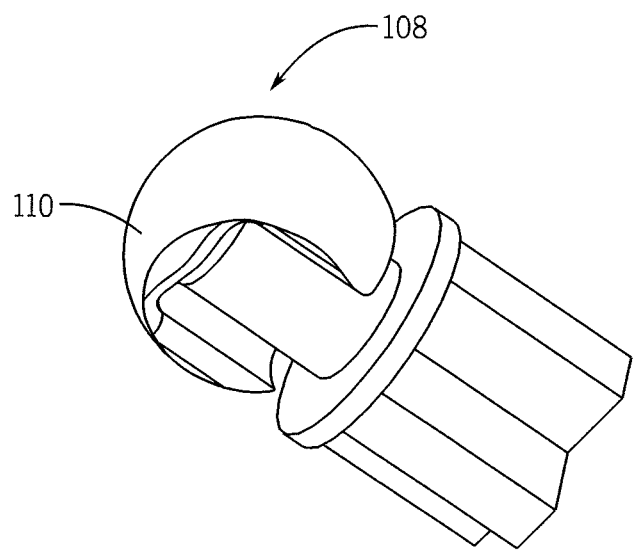
FIG. 7B is an isometric view of a male component for the coupling of FIG. 7A.

As one example of a tool-free configuration, FIGS. 7A and 7B illustrate hardware components that can be used to removably couple pads to the frame 32 or other parts of the emergency seat assembly 20. In the illustrated embodiment, the removable coupling includes coupling features configured as a female component 106 and a male component 108 with a semi-spherical head 110 that can be removably received within the female component 106. In some embodiments, as illustrated in FIGS. 7C and 7D, the pads (e.g., the base seat 22, the headrest 24, or the side cushions 28a, 28b, not all shown in FIGS. 7C and 7D) include one or more of the female components 106, while a corresponding one or more of the male components 108 are spaced about the frame 32 in order to extend into and support the female components 106 and the associated pads in a desired position. During installation, for example, the pads can be pushed toward the frame 32 until the heads 110 of the male components 108 extend into the female components 106 of the pads to secure the pads into place. In this regard, for example, the slight interference (or other) fit formed between the head 110 and the female component 106 can allow the pads to be appropriately secured to the frame 32 as well as easily installed or removed without the use of tools.

In other embodiments, other configurations are possible. As illustrated in FIG. 7E, for example, in some embodiments, male coupling features such as the male components 108 can be embedded in or otherwise secured to one or more pads of a seat assembly (e.g., the side cushion 28a, as illustrated) and corresponding female coupling features can be formed in or secured to the frame 32. As illustrated, for example, female coupling features are formed as round apertures 106a in the frame 32, which can receive the male components 108 to secure the side cushion 28a to the frame 32 without the use of tools. In some embodiments, other female coupling features, such as the female components 106 (see, e.g., FIG. 7C), can be formed in or secured to the frame 32. As noted above, in other embodiments, male or female coupling features can be variously disposed on other structures, as appropriate, to removably secure one or more seat pads to a frame.

As also noted above, it may be useful to configure a seat assembly to support tanks for emergency personnel (e.g., SCBA tanks). In some embodiments, it may be useful to configure a seat assembly to be easily adjustable to support a variety of sizes of tanks. Aspects of an example configuration for an adjustable tank support for the tank support assembly 34 are illustrated in FIGS. 8-20.

Figure 8:
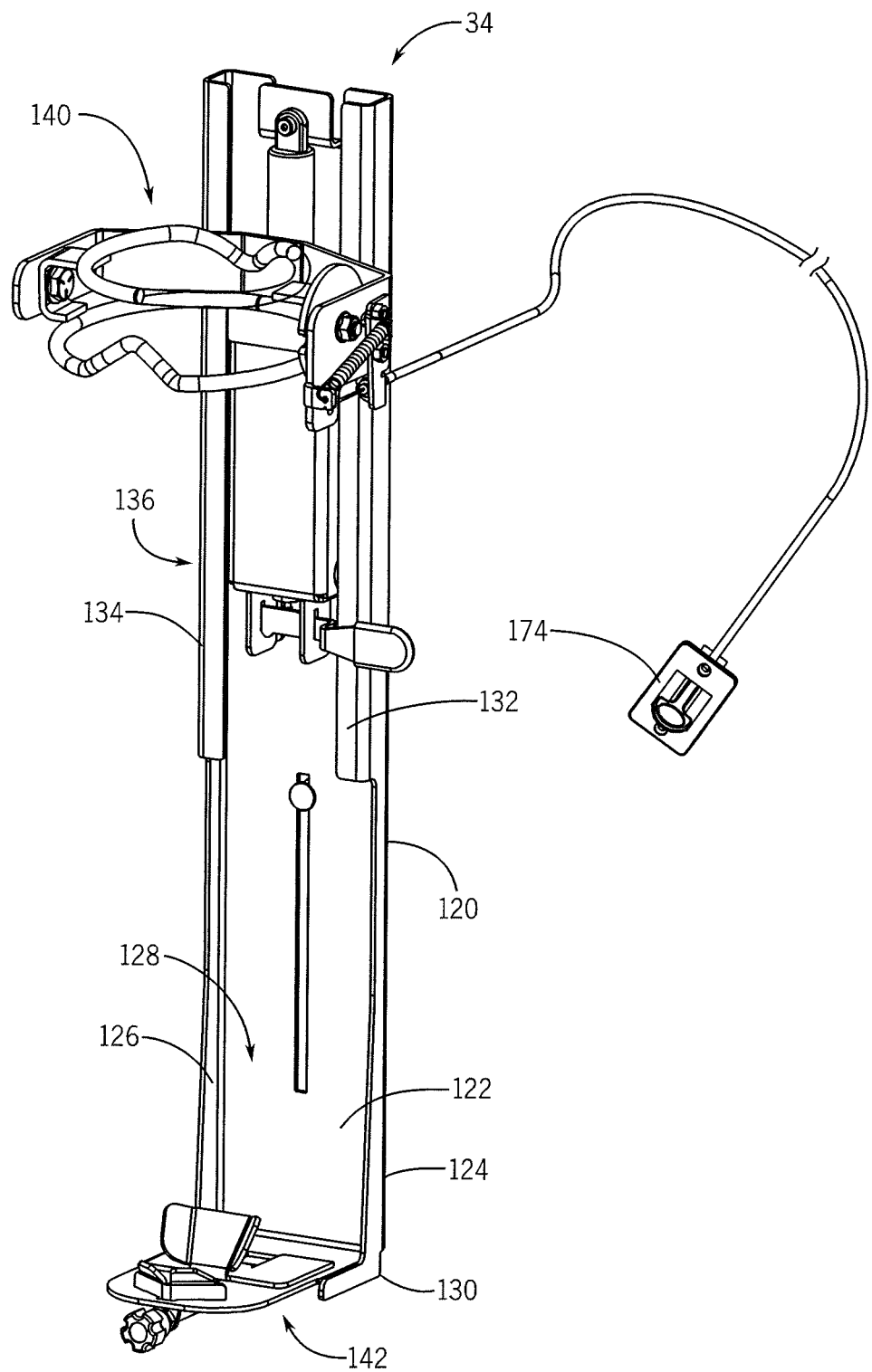
FIG. 8 is an isometric view of a tank support assembly for use with the emergency seat assembly of FIG. 1A.
Figure 9:
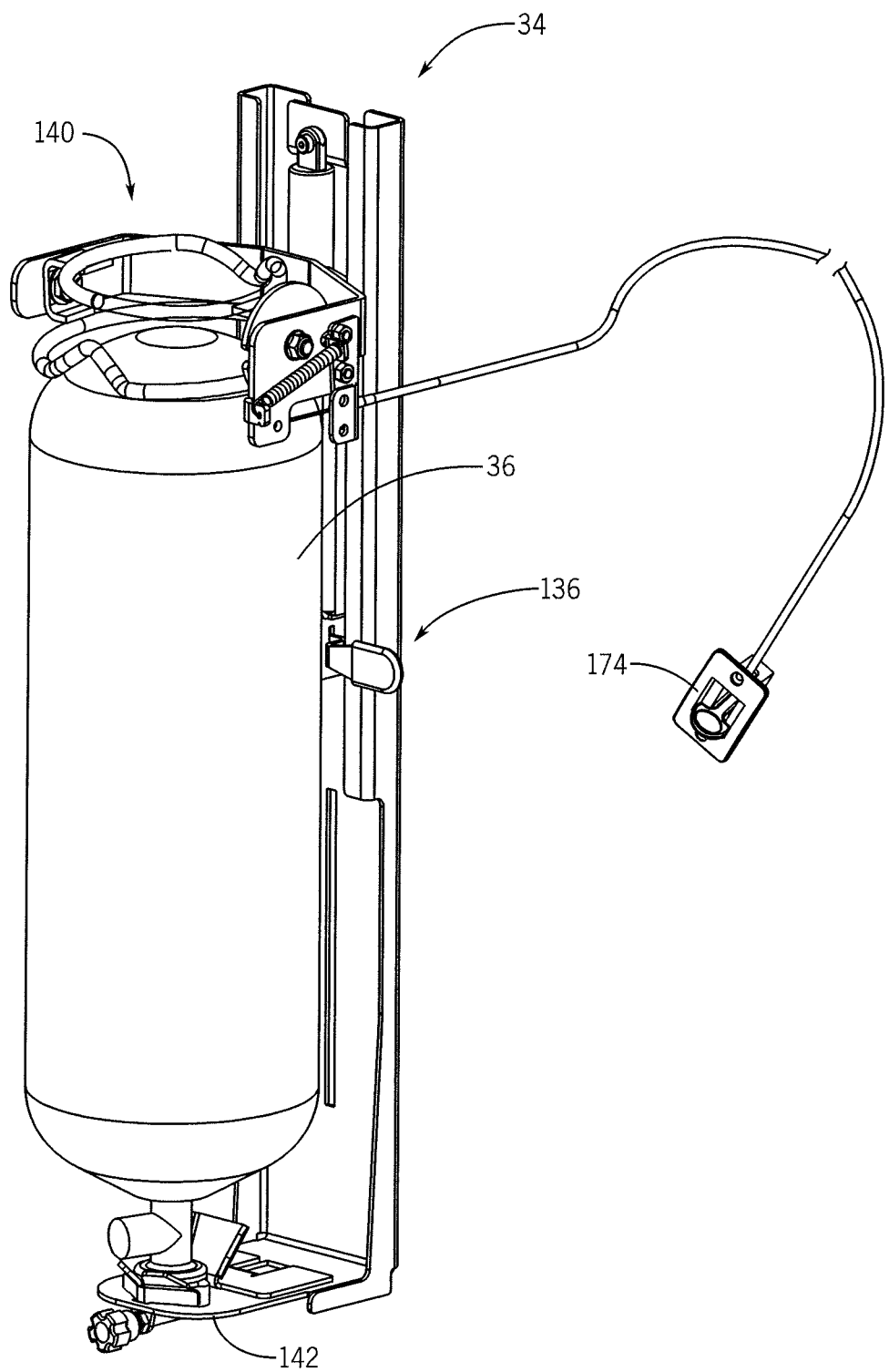
FIG. 9 is an isometric view of the tank support assembly of FIG. 8 with a tank.

As illustrated in FIG. 8 in particular, the illustrated embodiment of the tank support assembly 34 has a main support 120 having a rear wall 122 and side walls 124, 126 extending along the sides of the rear wall 122 to define a channel 128. Legs 130 that can help support the tank support assembly 34 extend away from the side walls 124, 126 at an end of the main support 120. Further, flaps 132, 134 extend inwardly along a portion of each of the side walls 124, 126 to define a set of tracks for a height adjustment assembly 136, as also discussed below. The flaps 132, 134 can be formed, for example, at the end of the main support 120 opposite the legs 130, or at other locations. A slot 135 extends along the rear wall 122 to receive mounting fasteners 137 to couple the tank support assembly 34 to the frame 32.

The tank support assembly 34 can be generally configured to be adjustable to appropriately secure SCBA tanks 36 of different heights and diameters. In the embodiment illustrated, for example, the tank support assembly 34 includes adjustable tank securing devices configured as a halo assembly 140, which is coupled to the height adjustment assembly 136, and a tank clamp assembly 142, which coupled to and positioned near an end of the main support 120.

The halo assembly 140 and the tank clamp assembly 142 can be independently adjusted, as appropriate, to receive and secure tanks of different sizes (e.g., the tank 36 and others (not shown)). In some implementations, for example, once a tank (e.g., the tank 36) is positioned and secured within the tank clamp assembly 142, the height adjustment assembly 136 can be lowered along a pathway defined by the main support 120, so that the halo assembly 140 seats around an upper end of the tank to further secure the tank within the tank support assembly 34.

Figure 10:
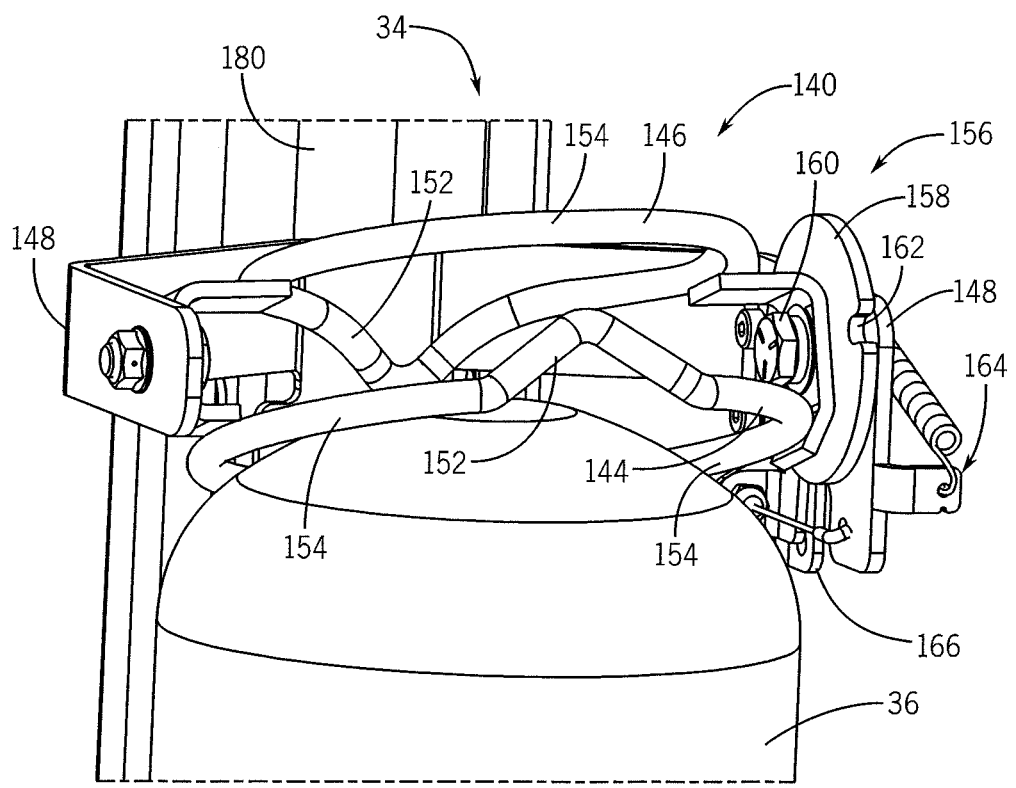
FIG. 10 is an enlarged isometric view of a halo assembly for the tank support assembly of FIG. 8.
Figure 11:
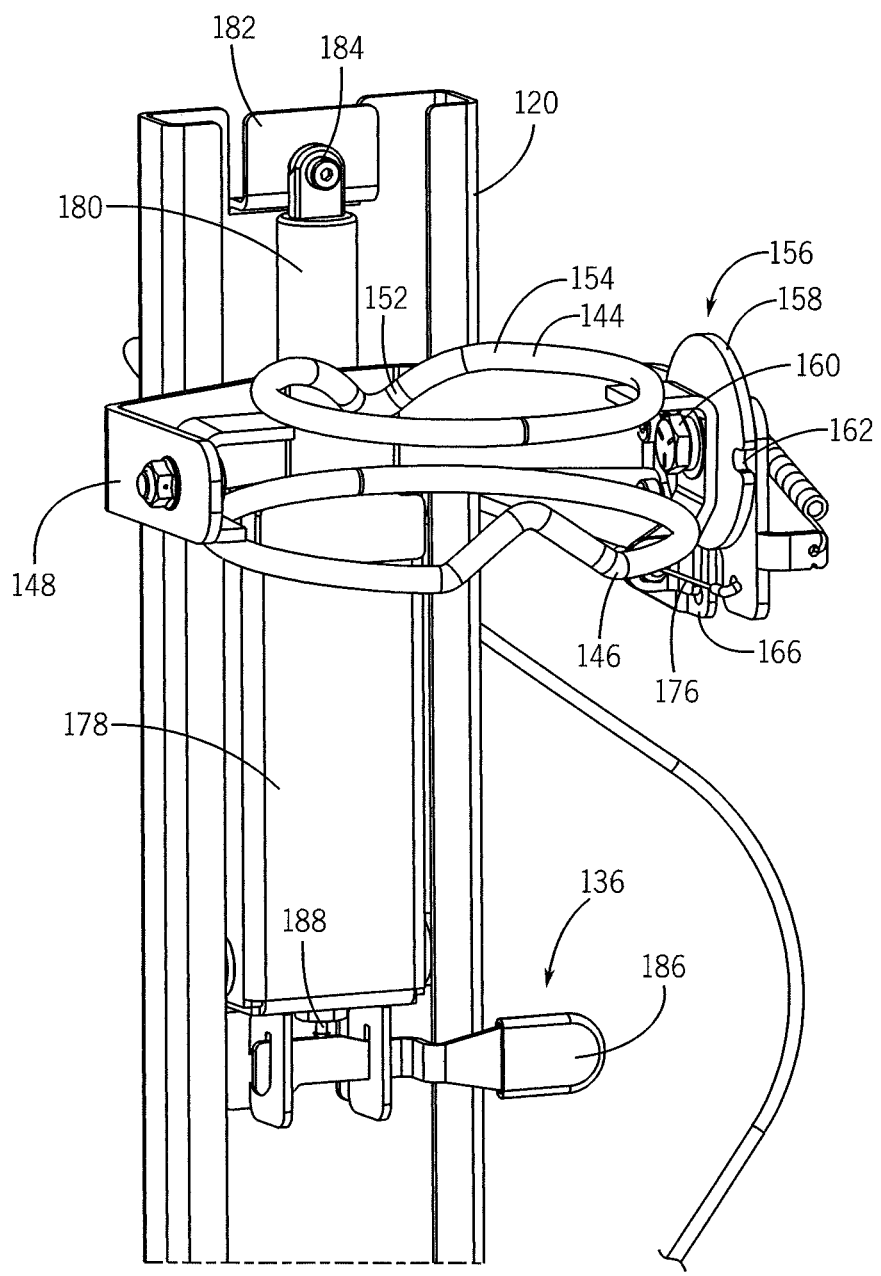
FIGS. 11 and 12 are enlarged isometric views of a height adjustment assembly for adjusting a position of the halo assembly of FIG. 10, with the halo assembly in different respective positions.
Figure 12:
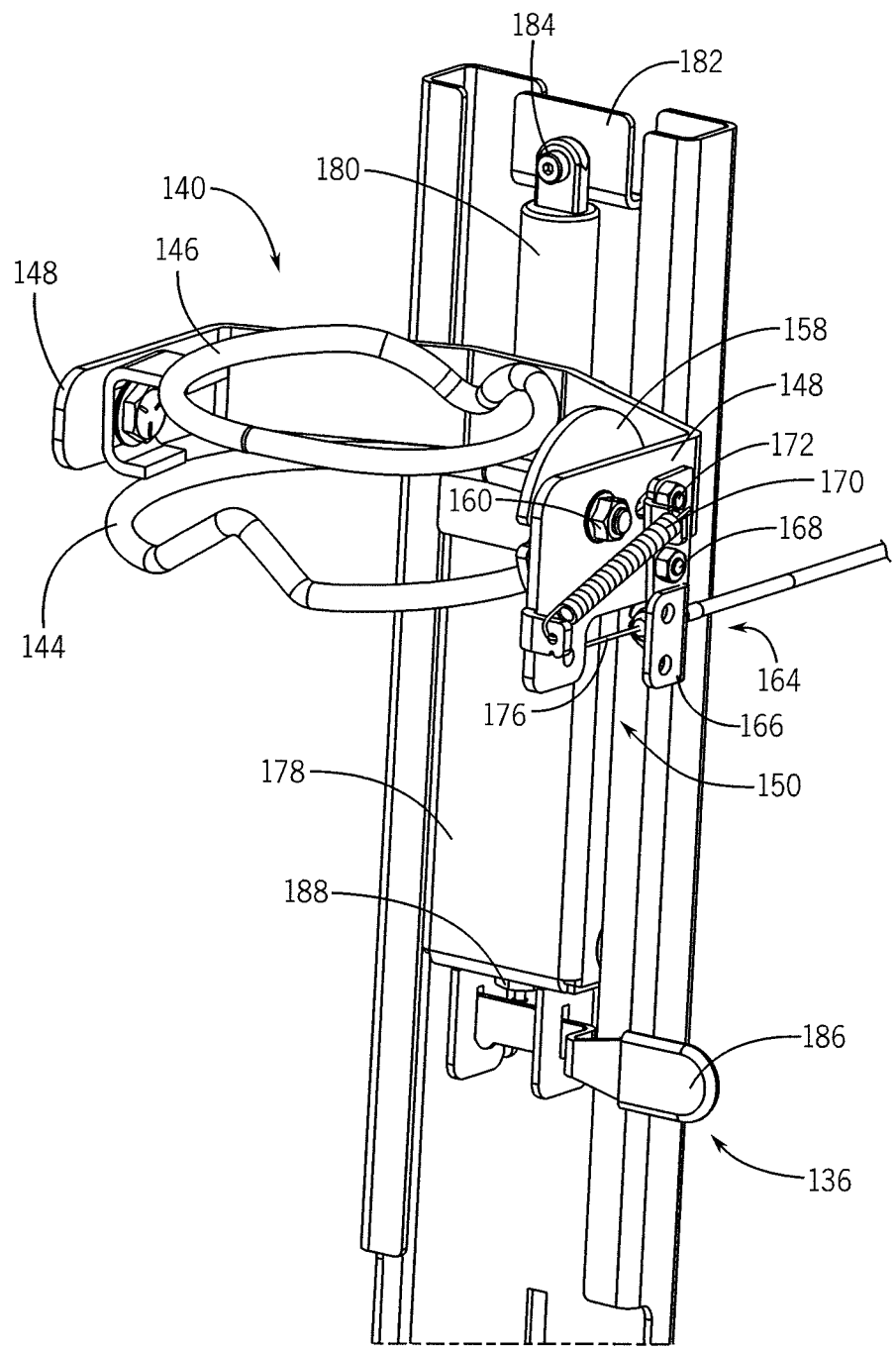
Figure 13:
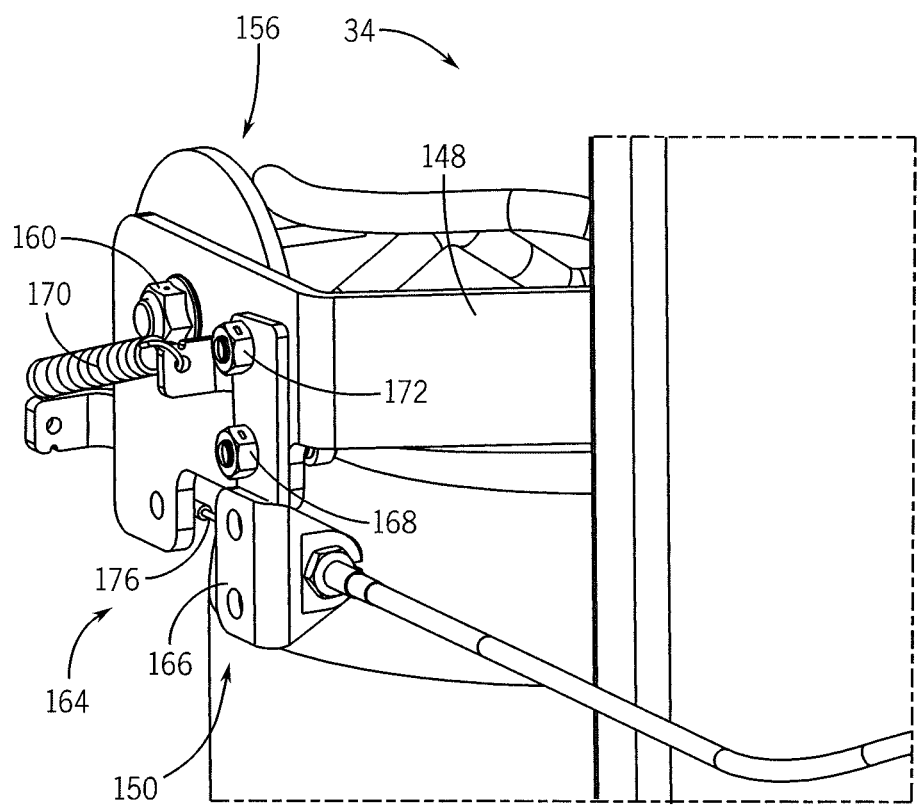
FIG. 13 is an isometric view of a release mechanism for the halo assembly of FIG. 10.

The halo assembly 140 can also be rotatably adjusted to accommodate tanks of different diameters. As illustrated in FIGS. 10-12 in particular, for example, the illustrated embodiment of the halo assembly 140 includes two opposing tank securements configured as halo structures 144, 146 that are generally aligned along a common central axis, but exhibit generally different sizes to receive tanks of different diameters. In order to select between different tank (and halo structure) sizes, the halo structures 144, 146 can be rotatably secured to the support assembly 34. For example, in the embodiment illustrated, the halo structures 144, 146 are rotatably coupled to and supported by two opposing arms 148 that extend away from the channel 128 formed in the main support 120. As explained below, a halo release mechanism 150 can be used to selectively permit rotation between the halo assembly 140 and the opposing arms 148 and thereby to selectively align one of the halo structures 144, 146 to engage (or release) a tank.

In the embodiment illustrated, the first halo structure 144 and second halo structure 146 are configured with engagement structures formed as relatively thin structured (e.g., wire-frame), substantially circular shapes, with different characteristic diameters. This configuration can be useful, for example, in order to accommodate tanks of different diameter, such as the tank 36 and a smaller tank (not shown). In other embodiments, other configurations are possible.

In some examples, the halo structures 144, 146 can include geometries that facilitate not only securing tanks but also releasing the tanks at appropriate times, such as when an emergency responder moves to exit the seat assembly 20 after securing attachment straps for a relevant tank. In this regard, for example, as illustrated in FIG. 10 in particular, each of the halo structures 144, 146 includes a generally circular portion 154 as well as a triangular projection 152 that deviates from the generally circular portion 154. Usefully, the triangular projections 152 (or other similar features) can provide a non-contact clearance area to help to release tanks (e.g., the tank 36) from the halo assembly 140 when the tanks are being generally removed from the tank support assembly 34. In other embodiments, other profiles are possible, including fully circular profiles, profiles with non-triangular projections, non-continuous profiles, and so on.

In some embodiments, the first halo structure 144 and the second halo structure 146 are both formed of a polymeric or metallic material that has a tubular cross-sectional profile. In other embodiments, other configurations are possible.

In general, as also noted above, the halo assembly 140 can be selectively rotated in order to align a particular one of the halo structures 144, 146 with a tank to be secured. In the embodiment illustrated, for example, the halo assembly 140 includes a locking mechanism 156 that allows selective rotation and locking of the halo assembly 140 relative to the opposing arms 148, in order to selectively secure a tank within, or release a tank from the tank support assembly 34.

In particular, in the locking mechanism 156, the halo structures 144, 146 are each coupled to a locking member configured as a disk 158. The disk 158, in turn, is rotatably coupled to one of the arms 148 using a fastener 160 that also serves as a rotating support for the halo structures 144, 146 generally.

Figure 14:
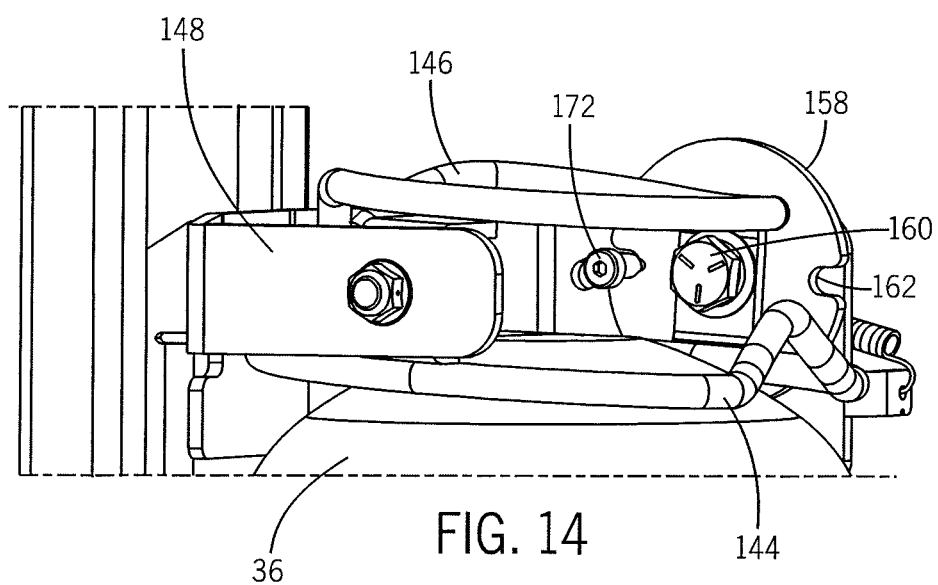
FIG. 14 is another enlarged isometric view of the halo assembly of FIG. 10.
Figure 15:
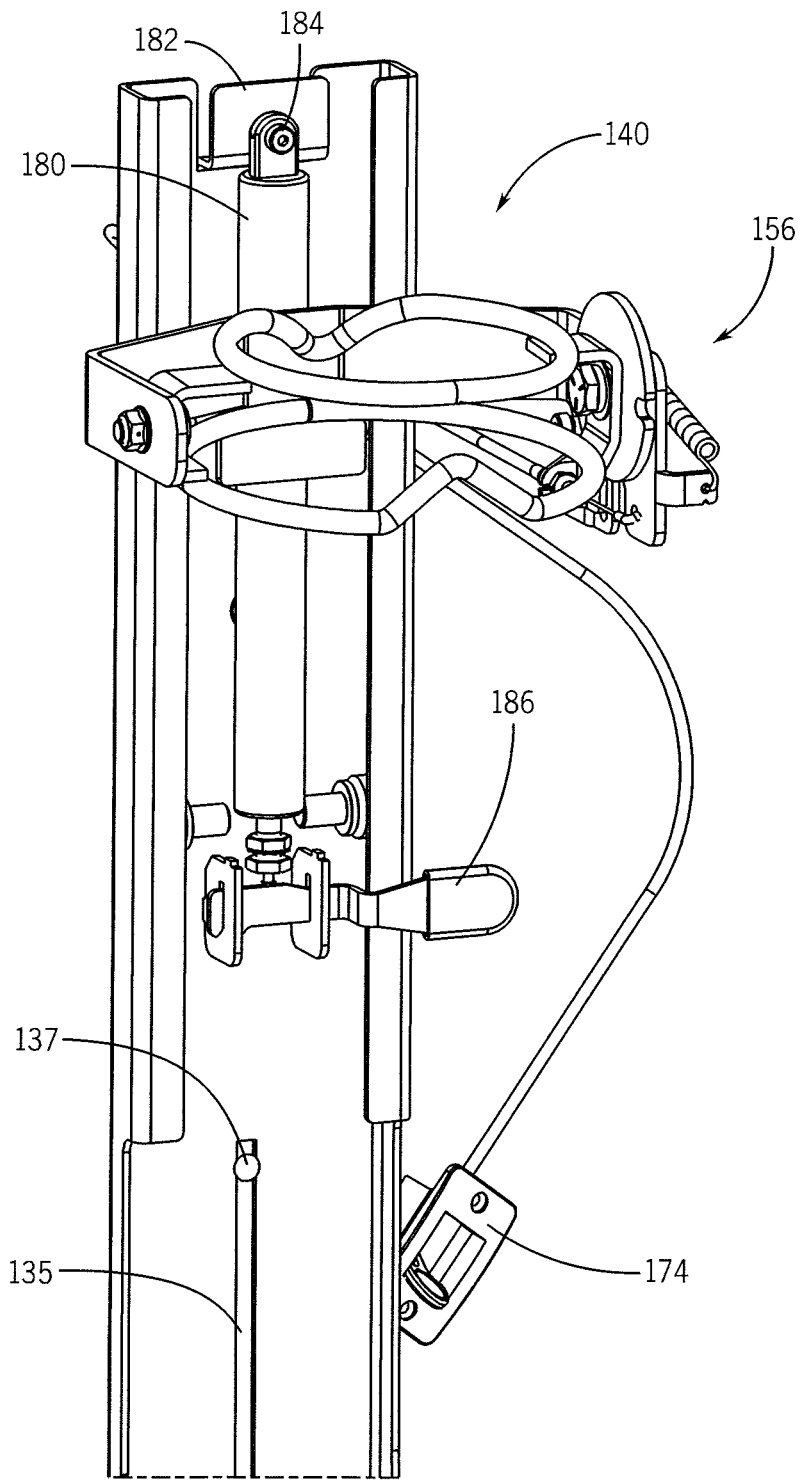
FIGS. 15 and 16 are enlarged isometric views of the height adjustment assembly of FIG. 11, with certain features removed to show a gas spring in a retracted position and an extend position, respectively.
Figure 16:
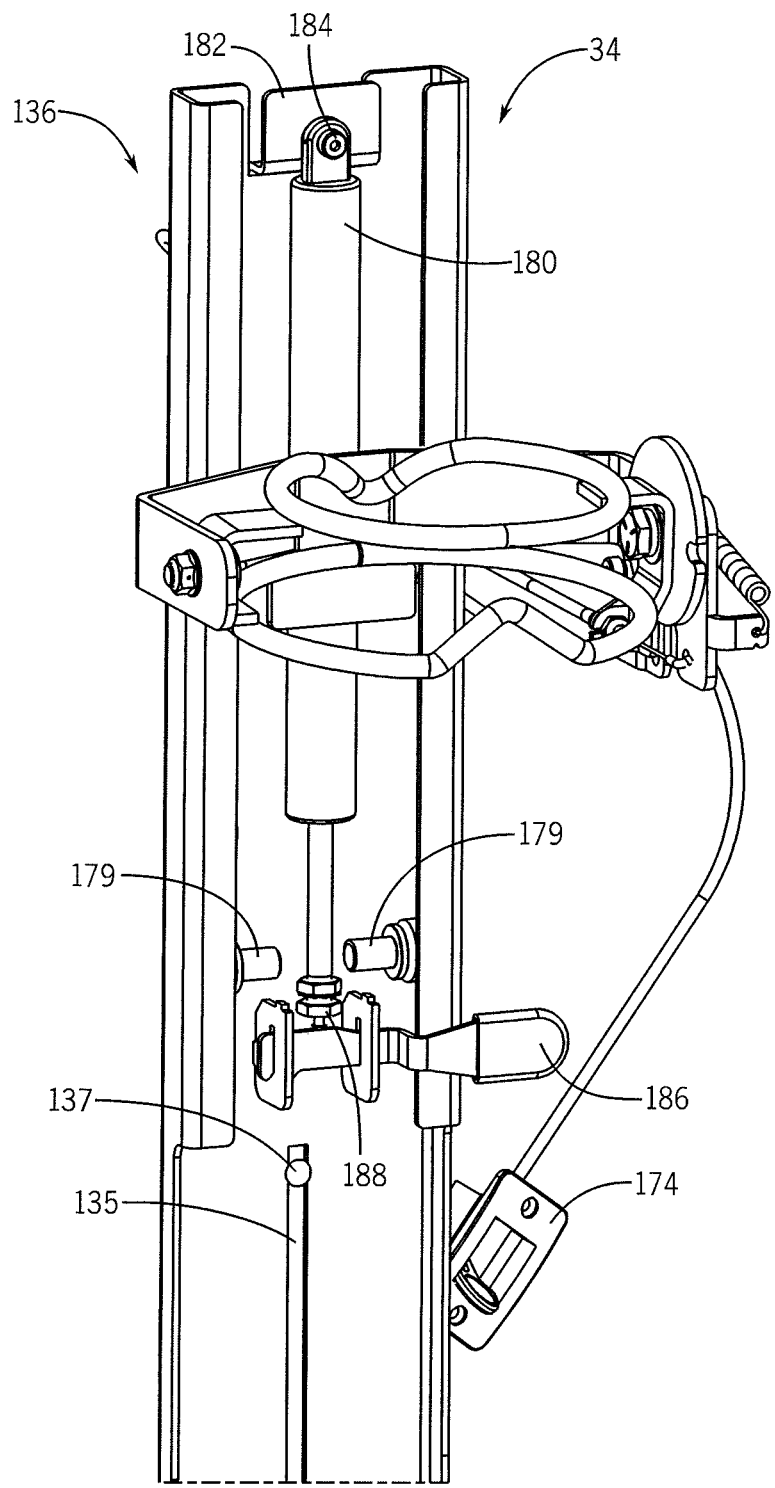

In order to allow the halo assembly 140 to be locked in at least two distinct configurations (e.g., with either of the halo structures 144, 146 aligned to engage a tank), the disk 158 of the release mechanism 150 includes a set of notches 162 (see, e.g., FIG. 14). Likewise, a locking mechanism 164 (see, e.g., FIG. 12) with a lever 166 is coupled to the same arm 148 as the disk 158, so that the lever 166 can selectively engage with the disk 158. In particular, in the embodiment illustrated, the lever 166 is pivotally mounted to the arm 148 using a bolt 168, which also serves as a pivot for the lever 166. Further, the lever 166 is biased toward a locking position by a spring 170 (partially shown in FIG. 12) that is also secured to the arm 148. A pin 172 is coupled to a top portion of the lever 166, and extends from the lever 166 past the arm 148 to be aligned to selectively engage either one of the notches 162 on the disk 158, depending on the alignment of the disk 158. Accordingly, with the disk 158 appropriately aligned, the bias of the spring 170 causes the pin 172 to extend into a select one of the notches 162, and thereby to lock the halo assembly 140 with a corresponding select one of the halo structures 144, 146 aligned to engage a tank.

In different embodiments, a tank can be released from the tank support assembly 34 in different ways. In the embodiment illustrated, for example, a user can manually or otherwise actuate a trigger 174 (see, e.g., FIG. 9) that is operable coupled to the lever 166 in order to release the pin 172 from the relevant notch 162. For example, the trigger 174 can be configured to alter the tension of a wire 176 (see, e.g., FIG. 12) that extends between the arm 148 and lever 166, and thereby cause the lever 166 to rotate away from the locked configuration. As the lever 166 rotates about the bolt 168, the pin 172 is removed from the notch 162, thereby allowing the halo assembly 140 to rotate about the fastener 160, so that the relevant halo structure 144, 146 can pivot to release the relevant tank.

To re-lock the halo assembly 140, the halo assembly 140 can then be further rotated (e.g., in an opposite direction) until a select one of the notches 162 is aligned for engagement by the pin 172 (e.g., as biased into the notch 162 by the spring 170). In some embodiments, the halo assembly 140 may tend to remain unlocked, even without continual engagement with the trigger 174, as long as the notches 162 are not aligned with the pin 172. This may be useful, for example, so that the halo assembly 140 remains canted (e.g., as in FIG. 10) to readily receive a tank as a user sits back down into the seat assembly 20 or a tank is otherwise introduced. Further, with some configurations of the halo structures 144, 146, as a tank is moved into engagement with the halo assembly (e.g., as the user sits), the tank can cause the halo assembly 140 to rotate out of a canted orientation (e.g., moving from the orientation of FIG. 10 to the orientation of FIG. 11) to realign one of the notches 162 with the pin 172. The pin 172, under the force of the spring 170, can then automatically engage the relevant notch 162 to secure the halo assembly 140 and the tank.

In some embodiments, vertical adjustment of a halo assembly can also be useful. For example, in the embodiment illustrated, as also noted above, the position of the halo assembly 140 can be controlled by the height adjustment assembly 136. As illustrated in FIGS. 12 and 15-17 in particular, in the embodiment illustrated, the height adjustment assembly 136 includes a carriage 178 (see FIG. 12) that supports the halo assembly 140 relative to the main support 120. In the embodiment illustrated, the carriage 178 is received within the channel 128 of the main support 120 and is movable as guided by the tracks defined by the flaps 132, 134. In particular, for example, roller bearings 179 are positioned within the tracks defined by the flaps 132, 134 to aid in relatively smooth vertical translation of the carriage 178. In other embodiments, other arrangements to facilitate translation of the carriage 178 (or another carriage) are possible.

In different embodiments, different adjustment mechanisms can be used. In the embodiment illustrated, for example, the position of the carriage 178 (and the halo assembly 140) can be adjusted using a gas spring 180 (see FIGS. 15-17), which is coupled to the main support 120 and the carriage 178. In some embodiments, the gas spring 180 is coupled to a tab 182 that extends inwardly away from the rear wall 122 into the channel 128 using a fastener 184. In other embodiments, other configurations are possible.

In different embodiments, a gas spring can be released for adjustment in different ways. In the embodiment illustrated, for example, an actuator 186 that extends through the carriage 178 can be used to control the gas spring 180 to alter the position of the carriage 178 within the channel 128 of the main support 120. In particular, the actuator 186 can be manually moved to selectively open the gas spring 180 for fluid communication with the external environment (e.g., atmospheric pressure) in order to selectively adjust and lock a position of the gas spring 180 and, correspondingly, the carriage 178 relative to the main support 120.

Figure 17:
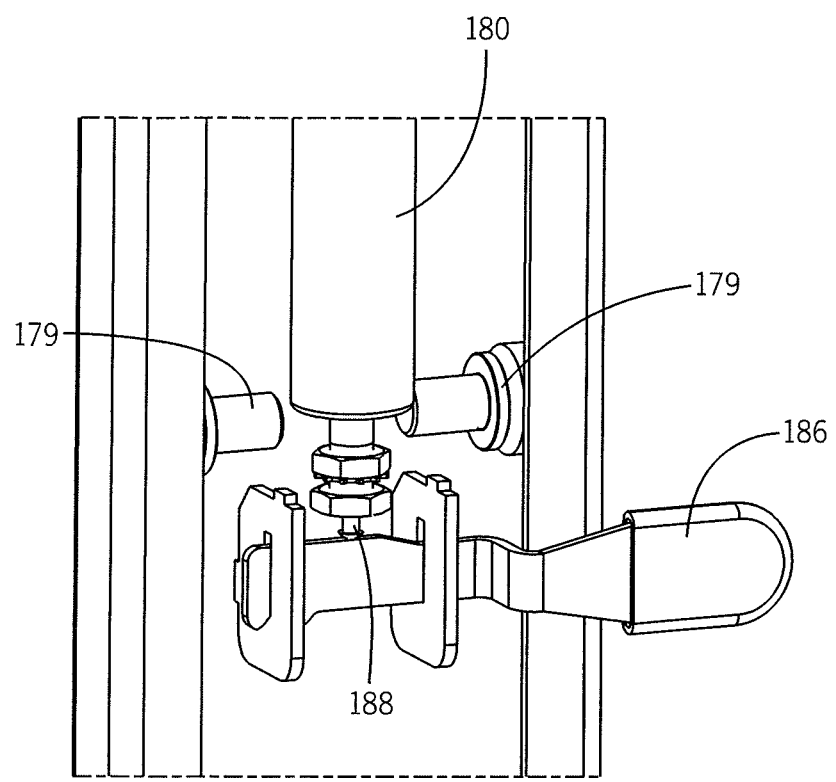
FIG. 17 is an enlarged isometric view of the height adjustment assembly of FIG. 11, including an actuator to adjust a length of the gas spring of FIGS. 15 and 16.

As shown in FIG. 17, for example, an upward rotation of the actuator 186 can urge the valve stem 188 upward in order to open the gas spring 180 for fluid communication with the environment. When the gas spring 180 is in fluid communication with the environment, the carriage 178 and halo assembly 140 can be translated relatively freely within the channel 128, as may be useful to secure or release a particular tank. Once the carriage 178 is properly positioned along the channel 128 (e.g., so that the halo assembly 140 has appropriately secured the tank 36), the actuator 186 can be released, and the gas spring can thereafter maintain the position of the carriage 178 and the halo assembly 140.

In some embodiments, the carriage 178 may be freely adjustable in a first direction but not in a second direction. For example, the carriage 178 can be configured to be freely movable in a downward direction but not in an upward direction. Such an arrangement, for example, can permit the halo assembly 140 to be easily moved into engagement with a tank without requiring specific actuation of the actuator 186, while also ensuring that the halo assembly 140 remains reliably engaged with the tank unless the actuator 186 is specifically actuated.

Figure 18:
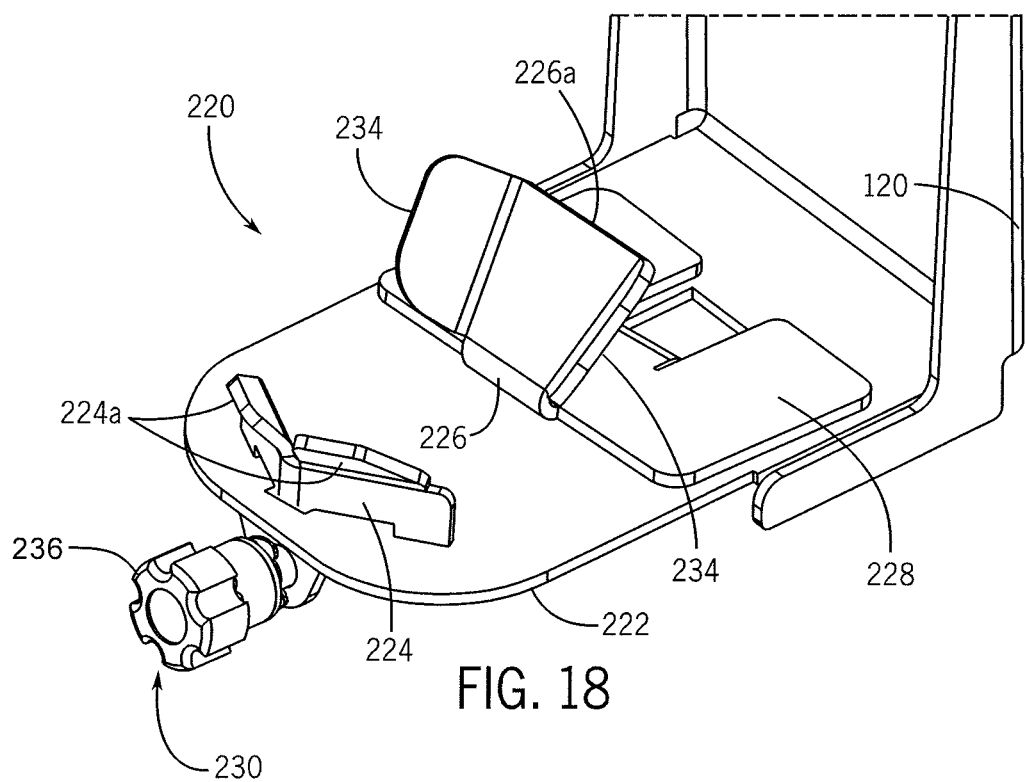
FIGS. 18 and 19 are top and bottom isometric views, respectively, of another tank clamp assembly for use with the tank support assembly of FIG. 8.
Figure 19:
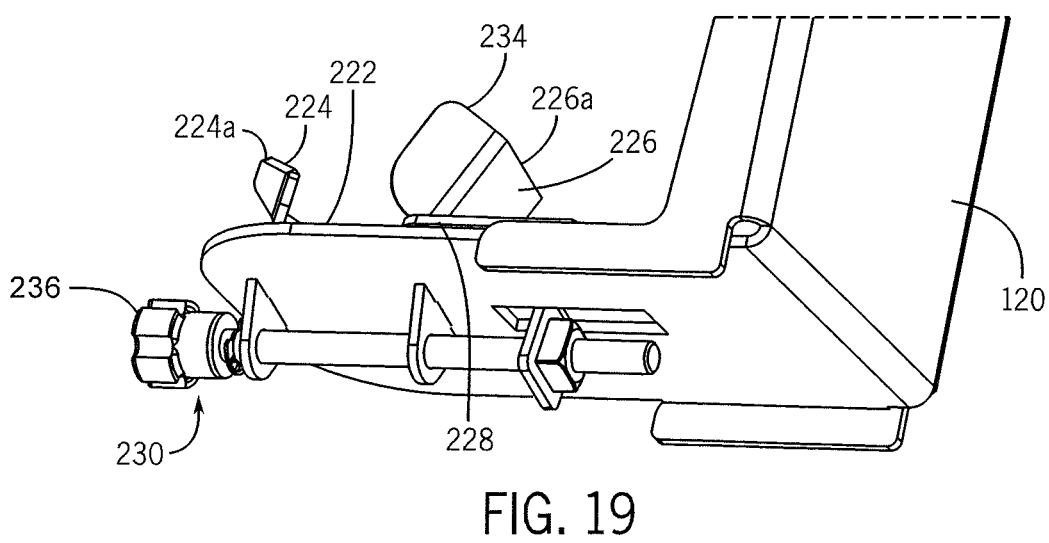
Figure 20:
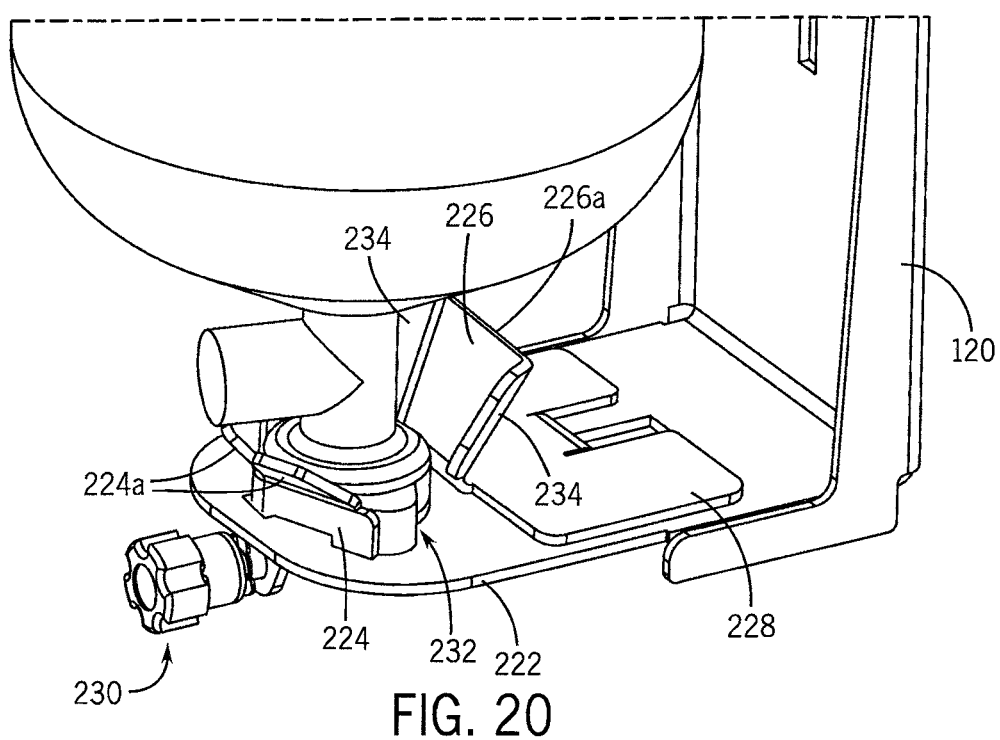
FIG. 20 is a top isometric view of the tank clamp assembly of FIGS. 18 and 19, with a partial view of a tank secured by the tank clamp assembly.

As also noted above, it may be useful to provide a clamp assembly that can accommodate different types or sizes of tanks. In this regard, for example, a tank clamp assembly 220, as illustrated in FIGS. 18-20, is configured to be adjustable to engage different tank geometries, including different geometries of tank bottoms. The tank clamp assembly 220 has a base plate 222 secured to the base of the support 120, a fixed foot clamp 224 secured to the base plate 222, a movable foot clamp 226 secured to a sliding plate 228, and a rotatable linear actuator 230.

With the illustrated arrangement, rotating the linear actuator 230 can slide the sliding plate 228 relative to the base plate 222 to clamp a tank bottom, such as the bottom end 232 (see FIG. 20), between the fixed and movable foot clamps 224, 226. In the embodiment illustrated, the sliding plate 228 is directly coupled to the actuator 230, and moves in parallel with the base plate 222, toward or away from the fixed foot clamp 224, to adjust the distance between the fixed foot clamp 224 and the movable foot clamp 226. Likewise, the actuator 230 is configured as a threaded actuator that is rotated to linearly adjust the position of the sliding plate 228 relative to the base plate 222 via rotation of a knob 236. In other embodiments, other configurations are possible.

In some embodiments, a clamp assembly can include fixed or movable portions that are arranged to guide insertion of a tank bottom and to help secure the tank bottom after insertion thereof. For example, the fixed and movable foot clamps 224, 226 of the assembly 220 include outwardly angled upper portions 224a, 226a that can help to guide a tank bottom end into an appropriately aligned engagement within the assembly 220. Once inserted, the tank bottom can then be secured by substantially vertical portions of the foot clamps 224, 226 that are disposed generally below the upper portions 224a, 226a. In other embodiments, however, other configurations are possible.

Generally, foot clamps can exhibit a wide range of geometries and structures. For example, the fixed foot clamp 224 is formed as a single, generally v-shaped component with a notch that divides the upper portion 224a into partially separated guides. Similarly, the movable foot clamp 226 is formed as a single component that is integral with the sliding plate 228. Additionally, the angled upper portion 226a of the movable foot clamp 226 includes a set of angled wings 234 configured to further guide a bottom end of a tank into an appropriate seated engagement within the assembly 220. It is also contemplated that in some embodiments, parts of the tank clamp assembly (e.g., the fixed foot clamp 224 and the movable foot clamp 226) can be formed as multiple features or configured to pivot in addition or alternative to sliding.

FIGS. 21A-23 illustrate an example emergency seat assembly 320 according to another embodiment of the invention. In many respects the emergency seat assembly 320 is similar to the emergency seat assembly 20 described above and similar numbering, in the 300 series, is used for the emergency seat assembly 320. For example, the emergency seat assembly 320 includes a base seat 322, a headrest 324, and a backrest 326 that includes a set of side cushions 328a, 328b. In the embodiment illustrated, the side cushions 328a, 328b are spaced apart and partially define a gap 330 through which equipment like an SCBA tank 36 (see FIG. 1) can extend. The base seat 322, headrest 324, and side cushions 328a, 328b are generally supported by a frame 332 that can, for example, be mounted to a floor or other surface of an emergency vehicle. A tank support assembly 334 is also coupled to the frame 332 to support and secure SCBA tanks of different sizes, such as the SCBA tank 36, within the emergency seat assembly 320. A restraint 338, such as a seatbelt, extends from one side of the frame 332 to the other to secure a passenger in place.

Also similarly to the emergency seat assembly 20, the emergency seat assembly 320 can be configured to provide a reclining feature in which the base seat 322 can move forward or backward to cause the backrest 326 to exhibit varying degrees of recline, such as to improve the comfort of riders while a tank is secured within the seat assembly 320. In some embodiments, to facilitate these types of adjustment, the base seat 322 sits upon an adjustable support assembly 356. The support assembly 356 can be coupled to the mounting plates 344 or other parts of the frame 332, and can allow forward and rearward motion of the base seat 322 relative to the frame 332, as partially shown in FIGS. 21A and 21B.

Figure 24:
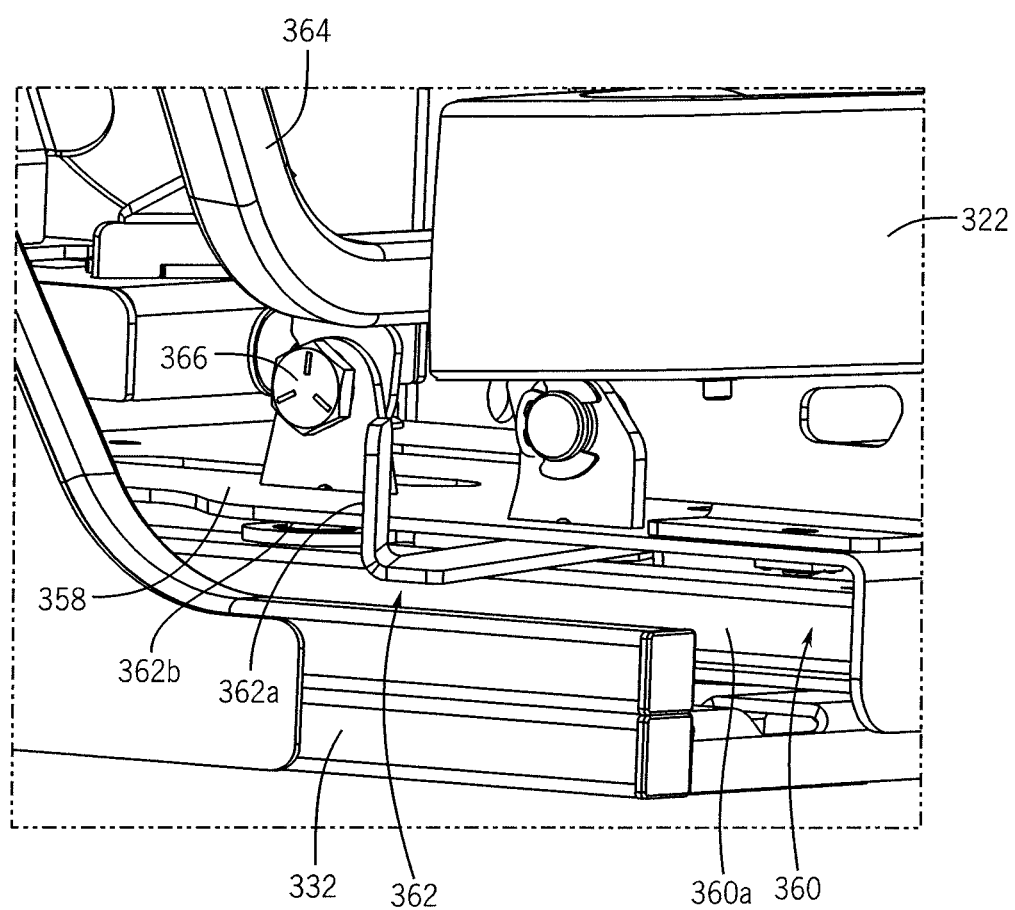
FIGS. 24 and 25 are enlarged isometric views of a slidable base arrangement for the emergency seat of FIG. 21A.
Figure 25:
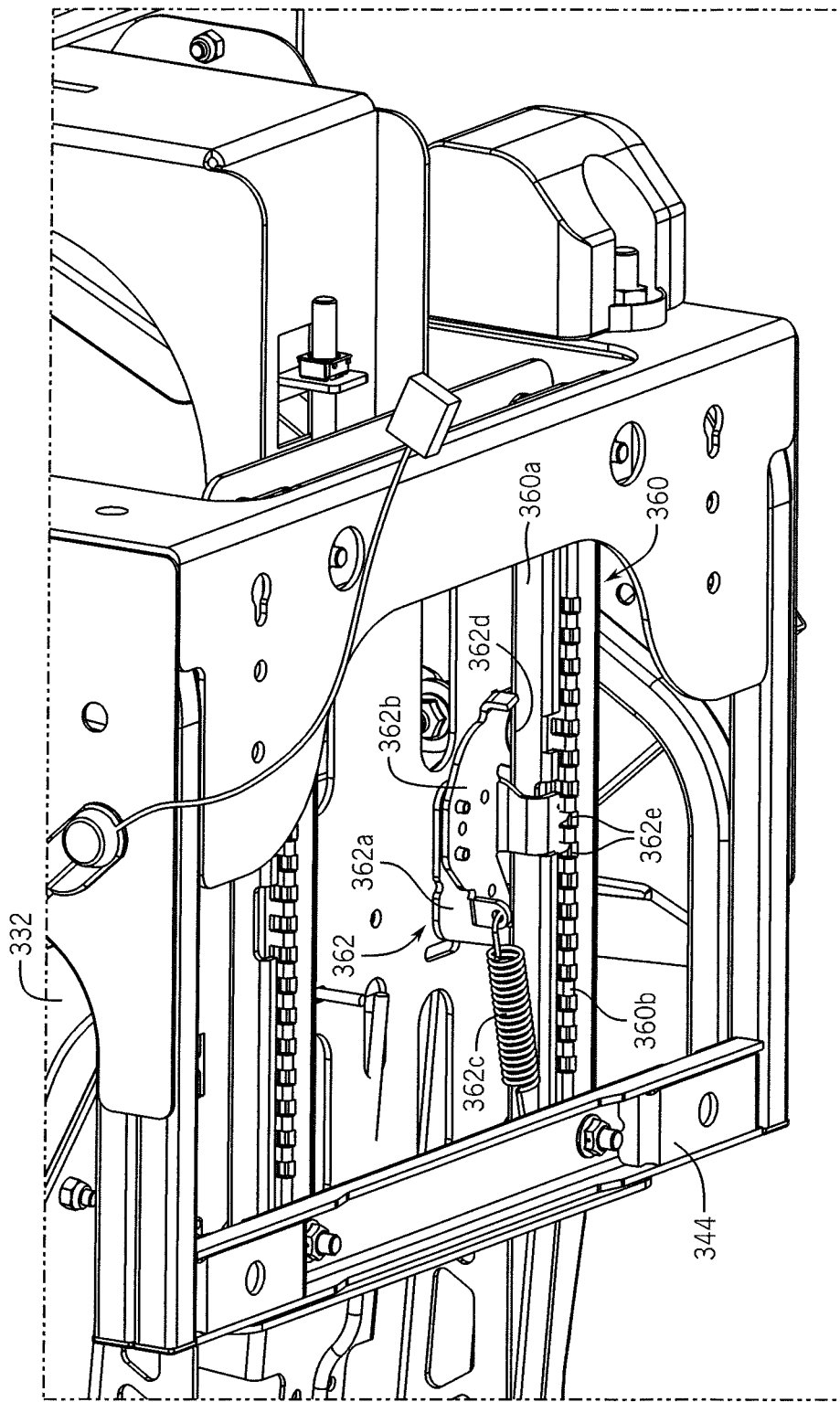

In the embodiment illustrated, the support assembly 356 includes a top plate 358 that supports the base seat 322 and is slidably coupled to the base of the frame 332 by a slidable rail arrangement 360 (see e.g., FIGS. 24 and 25). To facilitate sliding adjustment of the base seat 322, an actuator 362 includes a handle 362a (see FIG. 24) and a catch mechanism 362b (see FIG. 25) that engages the rail arrangement 360 and maintains that engagement with a spring 362c. The actuator handle 362a can be moved (e.g., manually pivoted or translated) to selectively engage or disengage the catch mechanism 362b and thereby selectively permit translational motion of the top plate 358 and the base seat 322 relative to the frame 332.

As shown in FIGS. 24 and 25 in particular, the actuator handle 362a and the catch mechanism 362b are attached to a slidable member 360a of the slidable rail arrangement 360 at an actuator handle pivot point 362d, about which the actuator handle 362a and catch mechanism 362b pivot. The catch mechanism 362b has teeth 362e that interface with a rack 360b of the rail arrangement 360 coupled to and extending between the mounting plates 344.

The catch mechanism 362b is normally biased in an engaged position by the spring 362c with the teeth 362e engaged with the rack 360b. However, during adjustment of the base seat 322, an operator can rotate the handle 362a at the actuator handle pivot point 362d, which increases the tension in the spring 362c and releases the teeth 362e from the rack 360b. The operator can then move the base seat 322 forwards or backwards relative to the rack 360b (e.g., while manually maintaining the position of the actuator handle 362a), with the slidable member 360a sliding with a particular range along the rack 360b. With the base seat 322 at a desired location, the operator can then allow the actuator handle 362a, as assisted by the spring 362c, to again move the teeth 362e of the catch mechanism 362b into mating engagement with the rack 360b and thereby secure the base seat 322 at the new location.

Figure 21A:
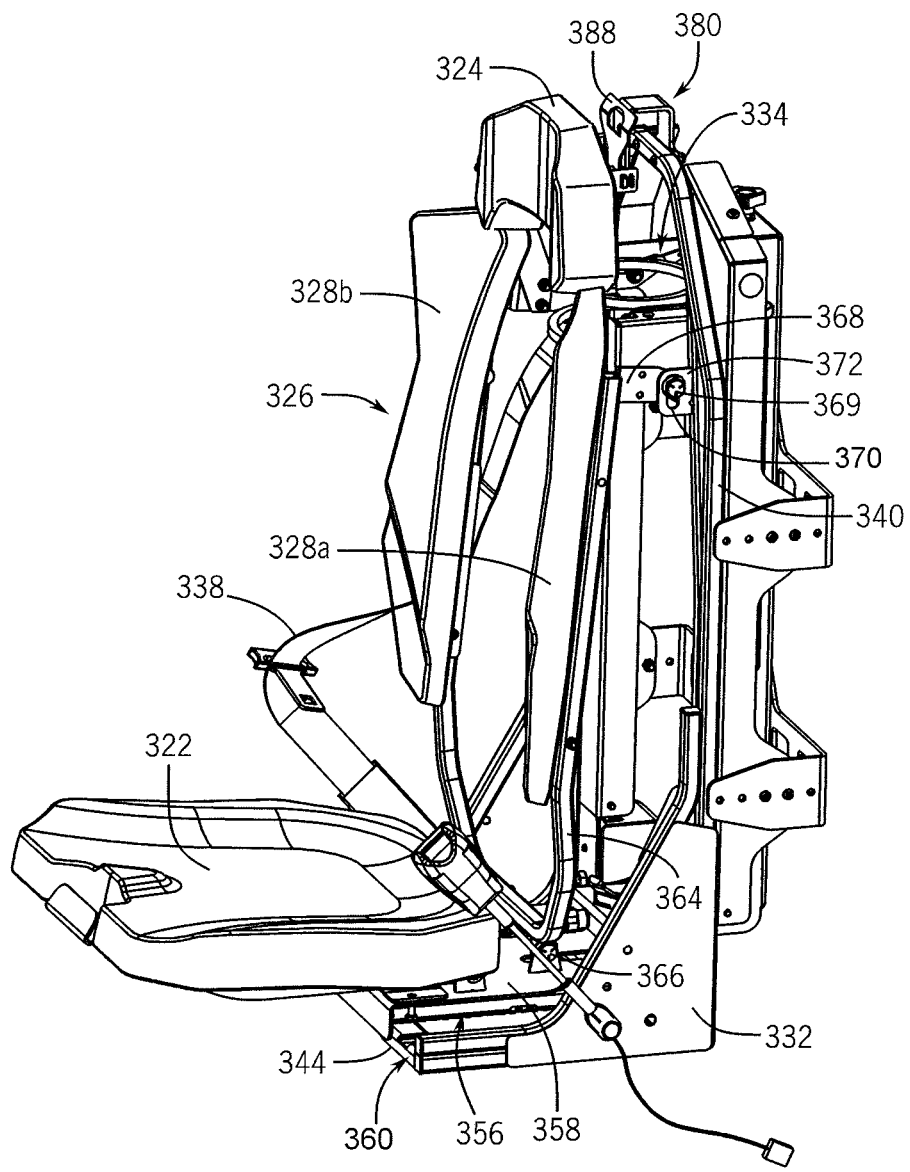
FIG. 21A is a front isometric view of an emergency seat assembly according to another embodiment of the invention with a backrest in an upright position.
Figure 21B:
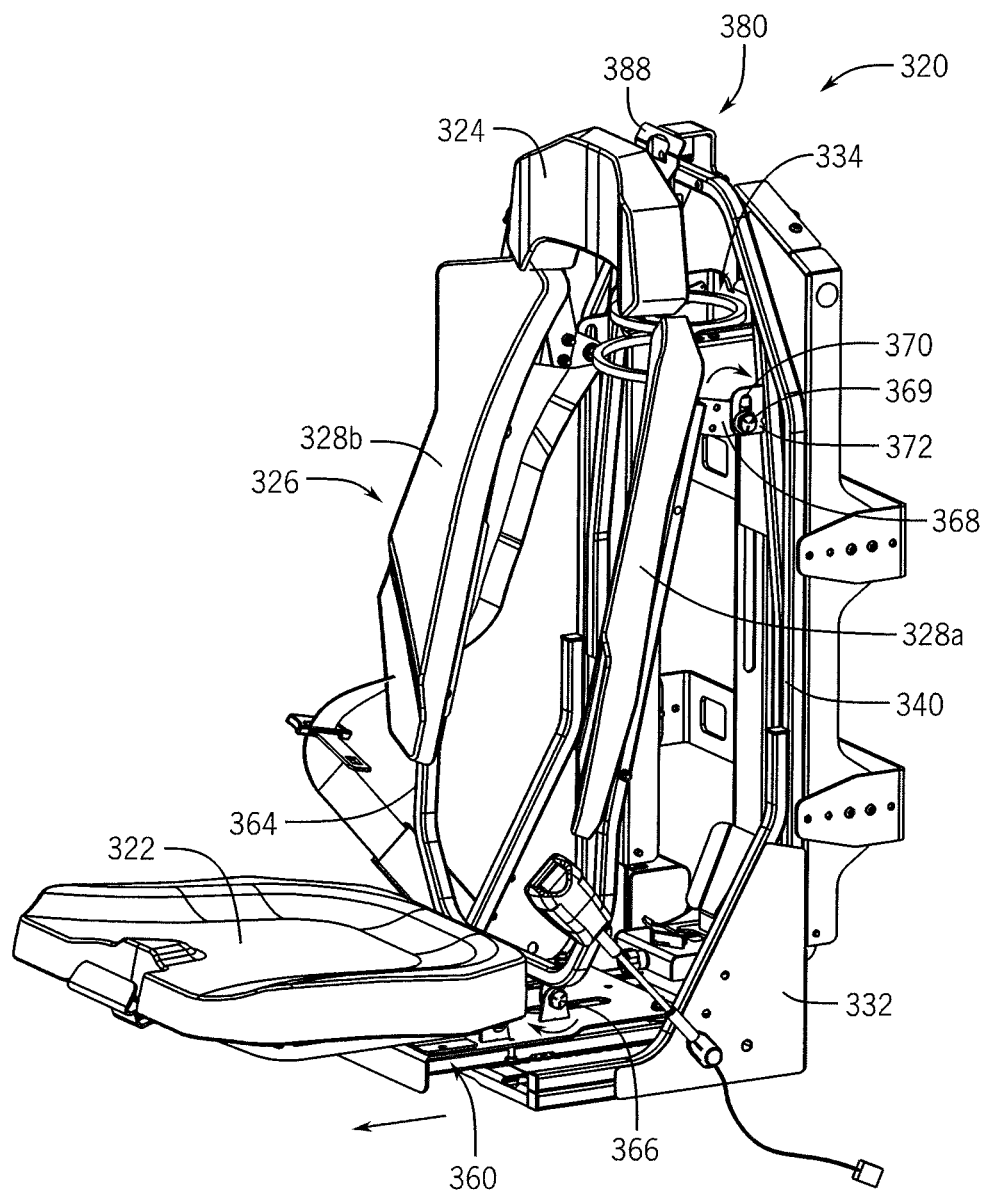
FIG. 21B is a front isometric view of the emergency seat assembly of FIG. 21A with the backrest in a reclined position.
Figure 22:
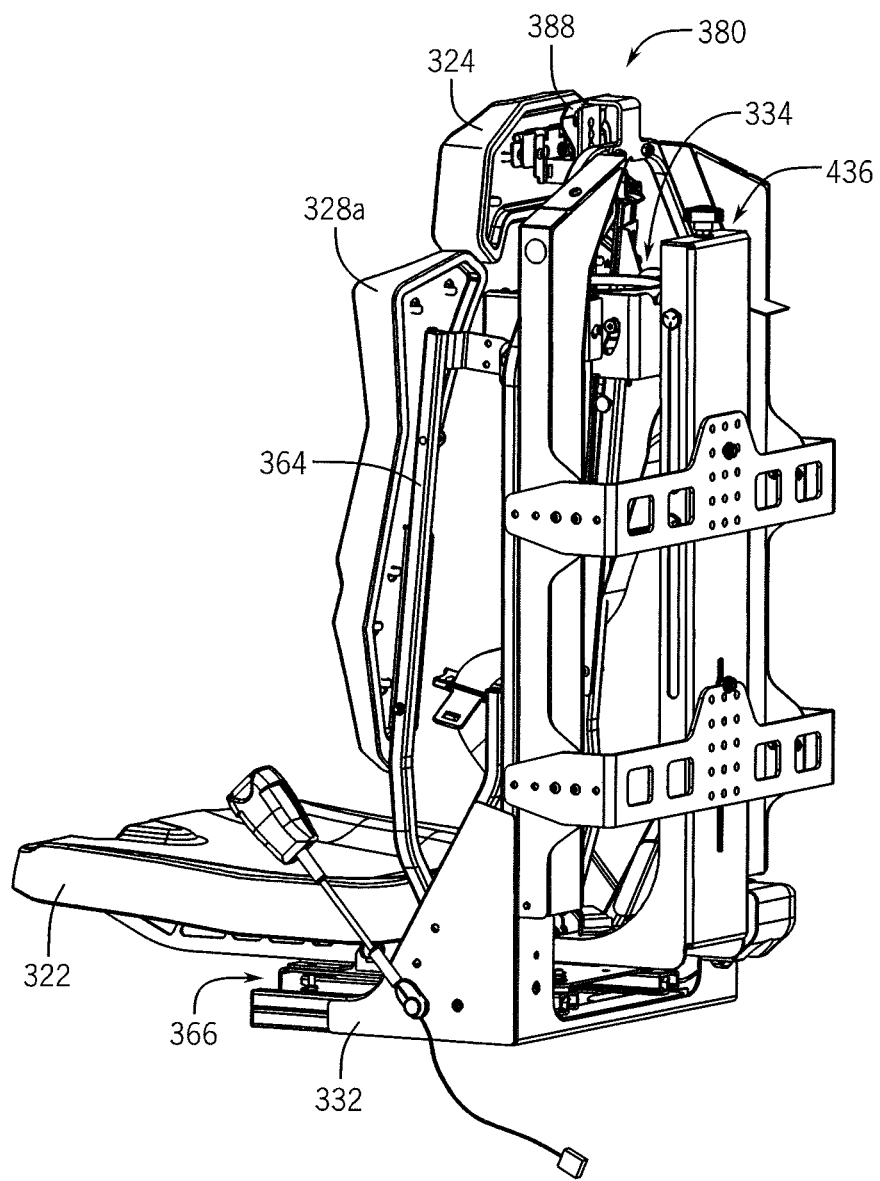
FIG. 22 is a rear isometric view of the emergency seat assembly of FIG. 21A.
Figure 23:
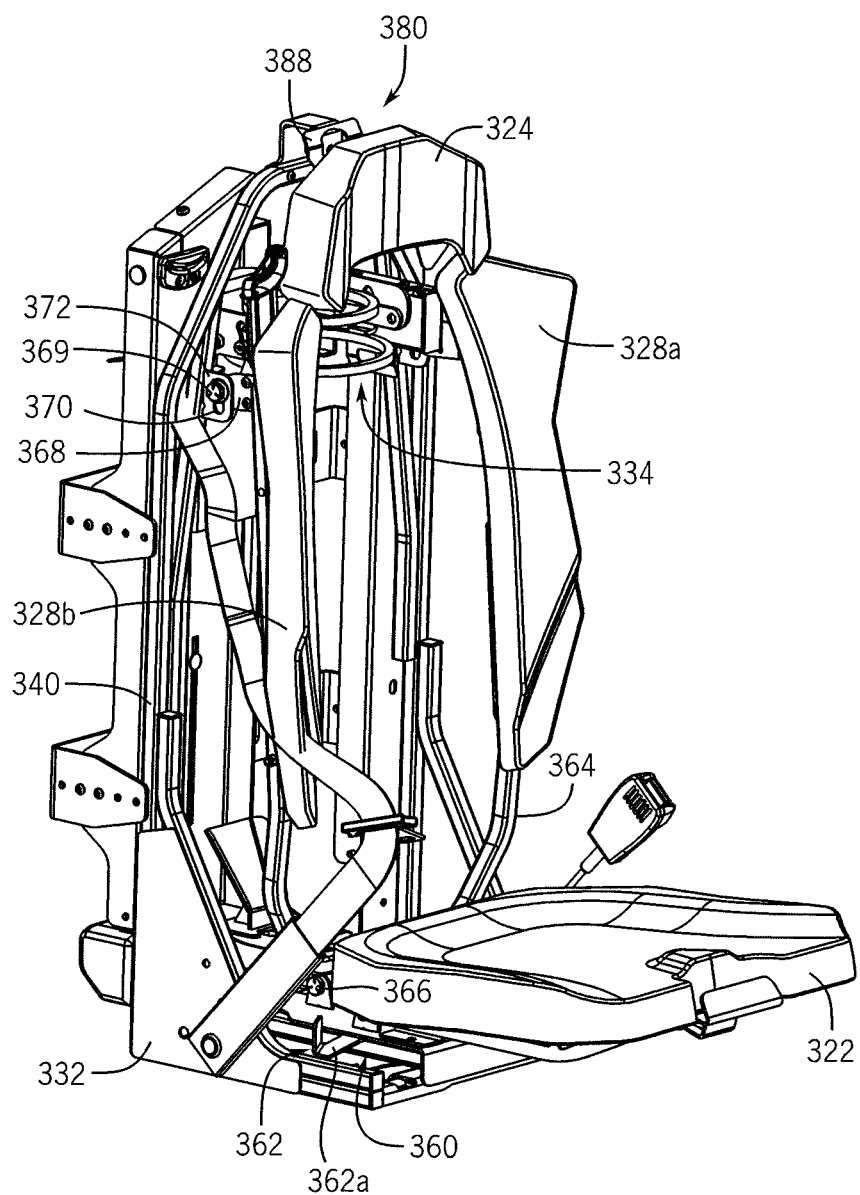
FIG. 23 is a front isometric view of the emergency seat assembly of FIG. 21A.

Also similarly to the support assembly 56, the support assembly 356 can be configured to cause simultaneously pivoting of the backrest 326 as the base seat 322 slides relative to the frame 332. For example, in the embodiment illustrated, as shown in FIGS. 21A and 21B in particular, a back support structure 364 is pivotally coupled to the top plate 358 of the support assembly 356 at a set of pivots 366 (only one pivot 366 shown in FIGS. 21A and 21B). The back support structure 364 is also slidably and pivotally secured to the rear support 340 via a set of arms 368 in pinned engagement (e.g., using the pins 369) with a set of slots 370 on tabs 372 that extend from the rear support 340. Because the back support structure 364 is pivotally coupled to the top plate 358 of the support assembly 356, and pivotally and slidably coupled to the frame 332 (i.e., at the connection between the pins 369 and the tabs 372), translation of the top plate 358 relative to the frame 332 simultaneously changes the recline angle of the back support structure 364 (and the attached side cushions 328a, 328b) relative to the base seat 322.

Despite many similarities, the seat assemblies 20, 320 also differ from each other in some aspects. For example, the adjustable headrest assembly 380 and the halo release mechanism 450 of the emergency seat assembly 320, differ from the respective elements in the emergency seat assembly 20.

Figure 26:
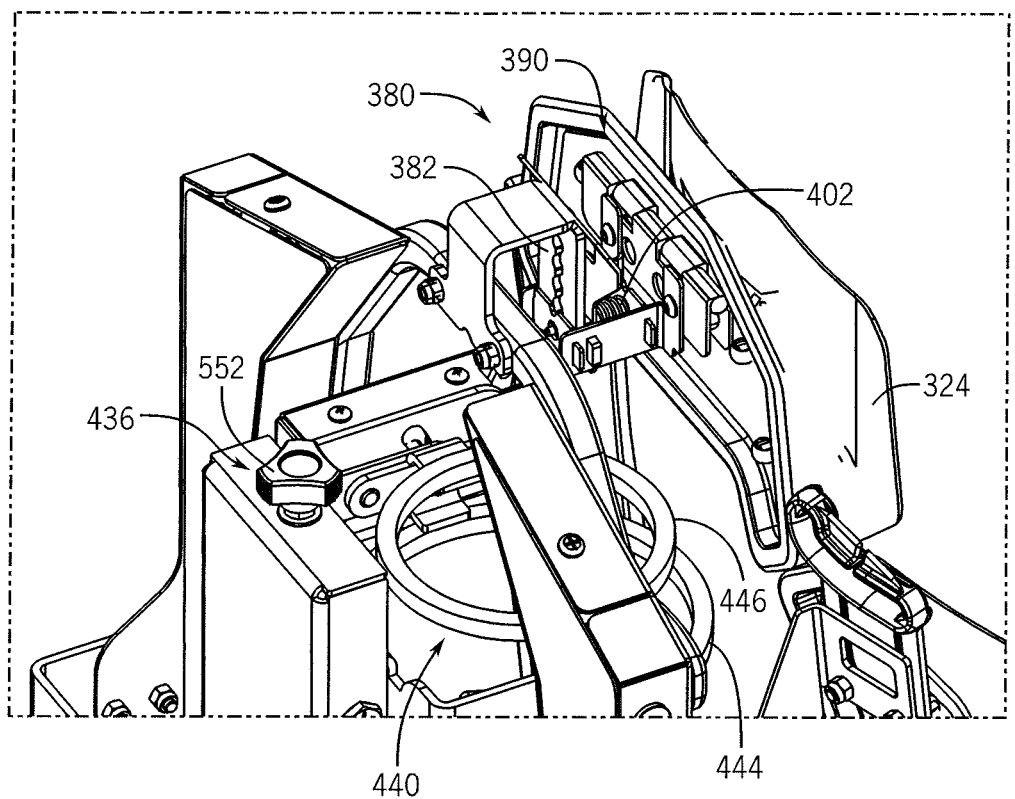
FIG. 26 is an enlarged isometric view of a headrest assembly for the emergency seat of FIG. 21A.
Figure 27:
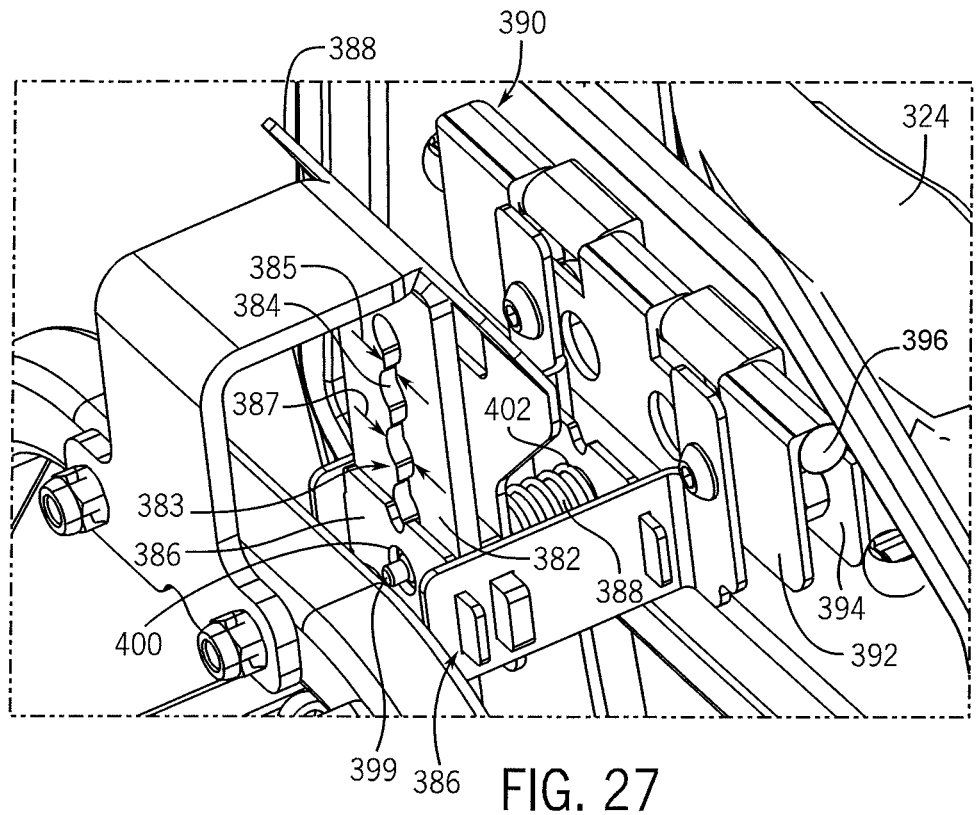
FIG. 27 is an enlarged isometric view of the headrest assembly shown in FIG. 26.
Figure 28:
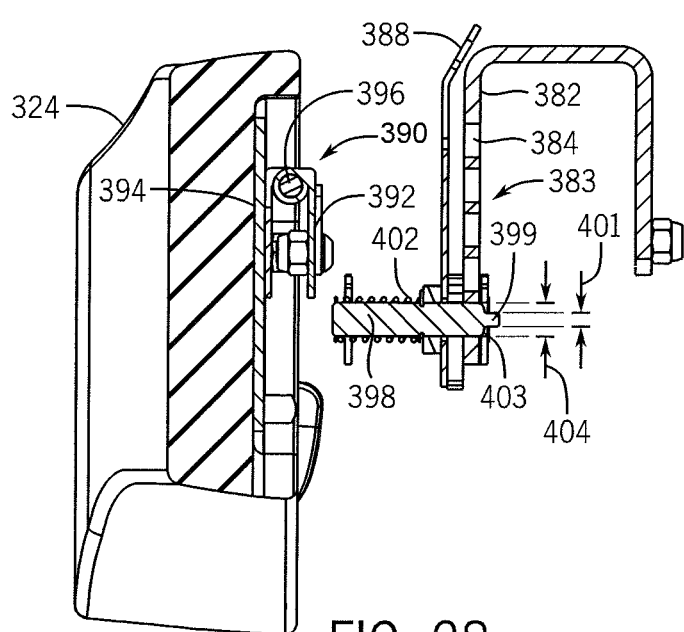
FIG. 28 is a cross-sectional view of the headrest assembly shown in FIG. 26.

Aspects of the adjustable headrest assembly 380 is shown in particular in FIGS. 26-28. In general, the adjustable headrest assembly 380 can be coupled to the rear support 340 of the frame 332, and can allow vertical and rotational adjustment of the headrest 324 relative to the frame 332. In the embodiment illustrated, the adjustable headrest assembly 380 includes a vertical plate 382 coupled to the frame 332 with a slot 383 interconnecting a plurality of holes 384 that extend through the plate 382. The plurality of holes 384 each have a hole diameter 387 and are aligned and equally spaced along the slot 383, which has a slot width 385. A mounting structure 386 is slidably secured around the vertical plate 382 and supports both the headrest 324 and an actuator tab 388 for height adjustment of the headrest 324, as also discussed below.

The mounting structure 386 is coupled to the headrest 324 with a hinge 390 to allow for pivoting movement of the headrest 324 relative to the mounting structure 386. The hinge 390 includes a stationary plate 392, coupled to the mounting structure 386, and a rotating plate 394, coupled to the headrest 324. The rotating plate 394 and the stationary plate 392 are joined by a hinge pin 396 that allows the rotating plate 394 to move upwardly and outwardly away from the stationary plate 392. In some cases, this outward rotation, as enabled by the hinge 390, can be useful when rescue personnel exiting the seat assembly 320 inadvertently cause the top of the SCBA tank 36 (see, e.g., FIG. 1B) to contact the headrest 324. In such an event (or at other times), the hinge 390 can allow the adjustable headrest assembly 380 to rotate freely outward, thereby letting the SCBA tank 36 pass without excessively impeding the movement of the relevant individual.

Continuing to look at FIGS. 27 and 28, an example height adjustment mechanism of the adjustable headrest assembly 380 is shown. In the embodiment illustrated, the actuator tab 388 is coupled to a spring-loaded pin 398 that is configured to be removably received within any one of the holes 384 in the vertical plate 382 and to be simultaneously and slidably received in a set of one or more holes 400 through one or more plates of the mounting structure 386. The pin 398 has an adjustment portion 399 with an adjustment portion diameter 401 and a placement portion 403 with a placement portion diameter 404. The adjustment portion diameter 401 has approximately the same or smaller dimension than the slot width 385 of the slot 383 in the vertical plate 382 and the placement portion diameter 404 has a dimension approximately the same or smaller than the hole diameter 387. A spring 402 is engaged with the pin 398 and, for example, seated against a plate of the mounting structure 386, in order to bias the spring 402 into engagement with the relevant holes 384, 400.

With the height adjustment mechanism thus arranged, the pin 398 is generally biased to engage the plate 382 and the mounting structure 386 to secure the headrest 324 at a particular height relative to the plate 382. Further, as illustrated in FIG. 28, by pulling the actuator tab 388 toward the headrest (or otherwise actuating the pin 398), the placement portion 403 of the pin 398 can be temporarily removed from the relevant hole 384 and from one or more of the holes 400, which would otherwise restrict vertical movement of the adjustable headrest assembly 380. Without the placement portion 403 of the pin 398 constraining movement of the headrest 324, the adjustable headrest assembly 380 can then be adjusted vertically along the slot 383 of the vertical plate 382, until the placement portion 403 of the pin 398 is aligned with one of the holes 384 at a desired height.

During adjustment of the headrest 324, the adjustment portion 399 of the pin 398 can remain at least partially inserted through the plate 382 and can accordingly travel along the slot 383. This can, for example, help to maintain alignment of the pin 398 relative to the holes 384 and thereby generally guide movement of the headrest assembly 380. Once the headrest assembly 380 is appropriately oriented, the actuator tab 388 can be released to allow the spring 402 to urge the pin 398 back through the hole 384 and one or more of the holes 400 and thereby to lock the adjustable headrest assembly 380 (and the headrest 324) at the desired height.

In other embodiments, other configurations are possible. For example, a mechanism other than the actuator tab 388 can be configured to control actuation of a locking pin for a headrest assembly. Or a non-pinned engagement, such as a clamp or ratchet can be used.

Also similarly to the emergency seat assembly 20, the emergency seat assembly 320 includes removable pads. For example, the base seat 322, headrest 324, and side cushions 328a, 328b (see, e.g., FIGS. 21A through 23) can all be removably coupled to the frame 332, or to one or more combinations of the frame 332, the back support structure 364, the headrest assembly 380, and the support assembly 356. This may allow the pads to be easily removed for cleaning after each use, which can reduce the risk of exposure to contaminants (e.g., asbestos, oil, etc.) that may have been brought into the vehicle during operation. In some embodiments, the removable pads can be made of a standard foam, and can be vinyl-covered, for example. In some embodiments, the pads can be formed of a skinned material. In some embodiments, the removable pads can be resilient (i.e., elastically flexible)

As stated above with respect to the emergency seat assembly 20, it may be useful to configure pads of the emergency seat assembly 320 to be removable without requiring the use of tools. For example, coupling features for tool-free engagement and disengagement can be formed in or secured to (e.g., embedded in) one or more parts of the seat assembly to allow tool-free attachment of pads to a relevant frame.

Figure 30:
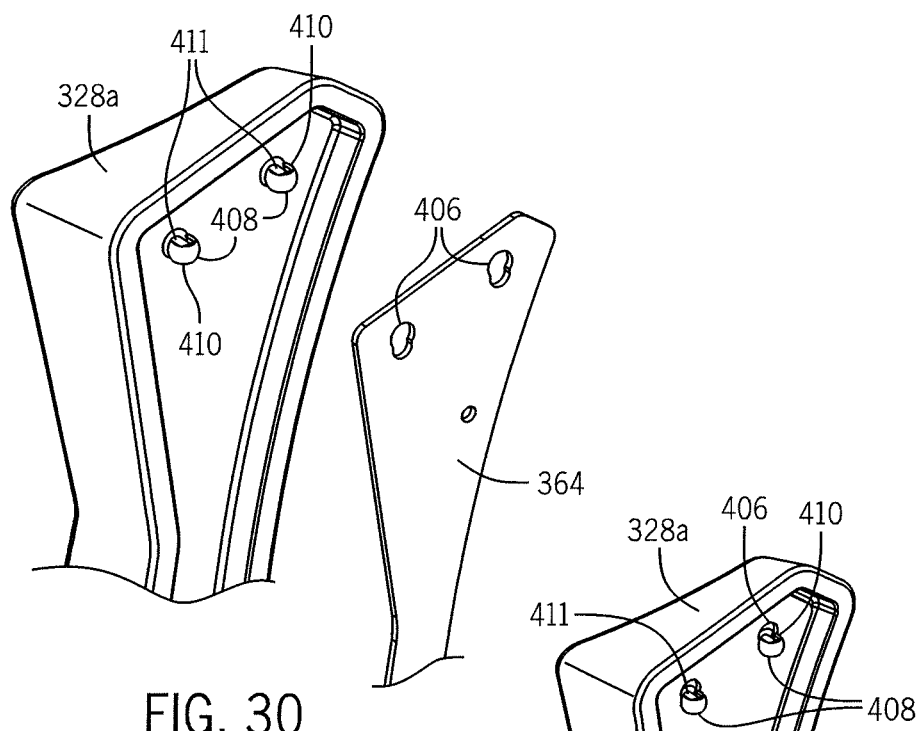
FIG. 30 is an enlarged isometric view of the seat pad assembly shown in FIG. 29.
Figure 29:
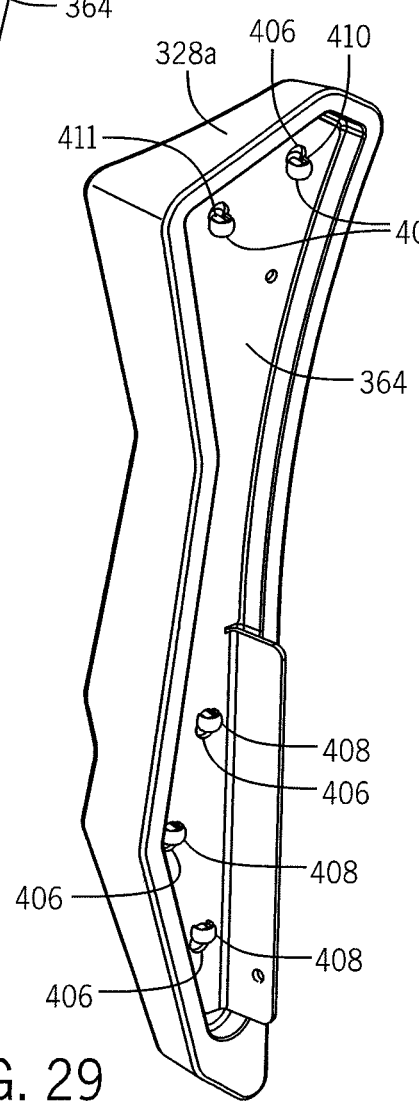
FIG. 29 is an isometric view of a seat pad assembly for the emergency seat assembly of FIG. 21A.
Figure 31:
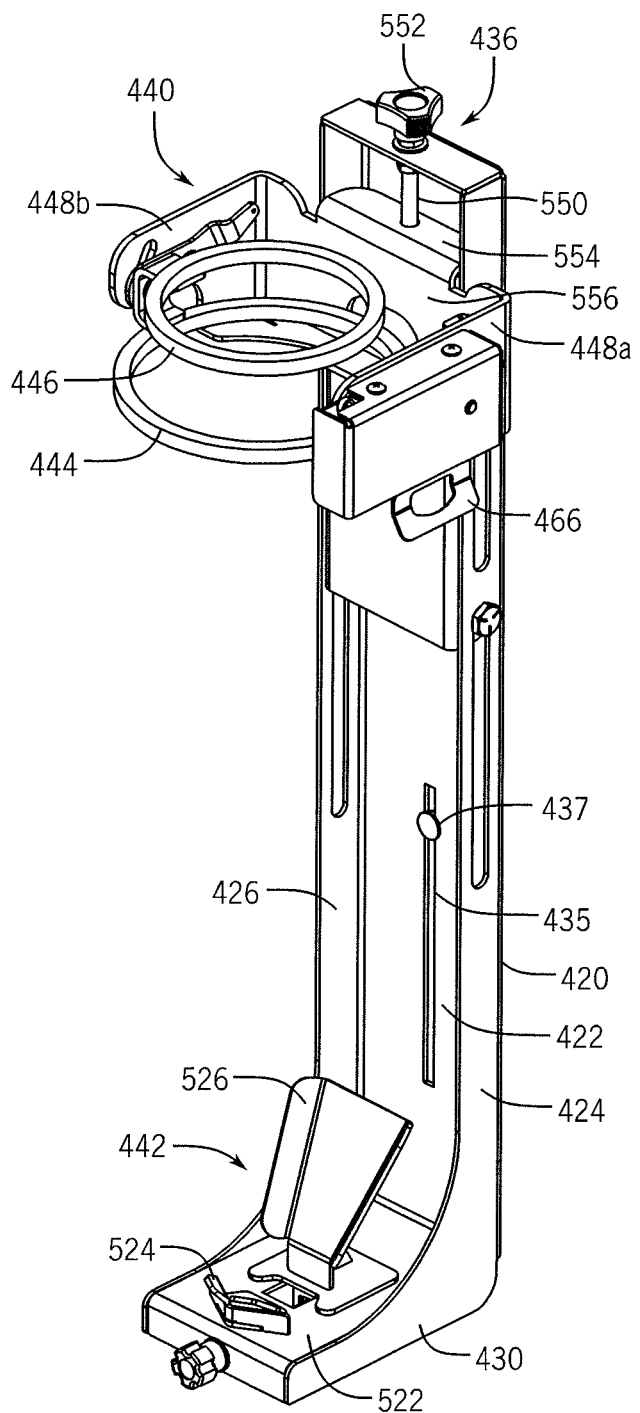
FIGS. 31 and 32 are front isometric views of an embodiment of a tank support assembly for use with the emergency seat assembly of FIG. 21A, with a halo assembly in a first orientation.

Another example of a tool-free configuration is provided in FIGS. 29 and 30, which illustrate hardware components that can be used to removably couple pads to the frame 332 or other parts of the emergency seat assembly 320. In the illustrated embodiment, the removable coupling includes coupling features configured as a female component 406 and a male component 408 with a semi-spherical head 410 and a neck 411 that can be removably received within the female component 406. The female component 406 is configured as a keyhole opening in which the semi-spherical head 410 of the male component 408 is received through the larger portion and, during installation, the male component 408 is slid down in the female component 406 so that the neck 411 of the male component 408 resides in the smaller portion of the key-hole opening. For removal of the pad, this procedure can be reversed.

In some embodiments, as illustrated in FIG. 29, the keyhole openings interacting with one end of the pad are oriented in a different direction than the keyhole openings interacting with the other end of the pad. This arrangement can help to avoid accidental removal of the pad when an occupant moves around within the emergency seat assembly 320. For example, with the illustrated arrangement, it may be necessary to stretch the pad of the side cushion 328a (or another pad) generally along the vertical direction in order to seat the male components 408 within the top- and bottom-end female components 406, or to remove the male components 408 therefrom. Accordingly, the side cushion 328a may generally remain secured to the back support structure 364 during active use of the seat assembly 320, but, particularly with the pad of the side cushion 328a exhibiting a resilient construction, may be readily removed from the back support structure 364 as needed.

In other embodiments, other configurations are possible. For example, as also discussed above, some embodiments may include female components on a pad and male components on part of a frame. As another example, male components with non-spherical heads or keyhole slots with tapered geometry that differs from the tapered geometry of the female components 406 are also possible.

The seat assembly 320 also includes a tank support assembly 334, as shown in FIGS. 23 and 31-39. Similarly to the tank support assembly 34 described above, the tank support assembly 334 has a main support 420 with a rear wall 422 and side walls 424, 426 extending along the sides of the rear wall 422 to define a channel 428. Legs 430 that can help support the tank support assembly 334 extend away from the side walls 424, 426 at an end of the main support 420, and a slot 435 extends along the rear wall 422 to receive mounting fasteners 437 to couple the tank support assembly 334 to the frame 332.

The tank support assembly 334 is configured to be adjustable to appropriately secure SCBA tanks (e.g., the tank 36 of FIG. 1A) of different heights and diameters. In particular, in the embodiment illustrated, the tank support assembly 334 includes adjustable tank securing devices configured as a halo assembly 440 that is coupled to the height adjustment assembly 436, and a tank clamp assembly 442 that is coupled to and positioned near an end of the main support 420. The halo assembly 440 and the tank clamp assembly 442 are separately adjustable to receive and secure tanks of different sizes (e.g., the tank 36 or others (not shown)). In some implementations, for example, once a tank (e.g., the tank 36) is positioned and secured within the tank clamp assembly 442, the height adjustment assembly 436 can be lowered along a pathway defined by the main support 420 until the halo assembly 440 is seated around an upper end of the tank to further secure the tank within the tank support assembly 334.

Figure 35:
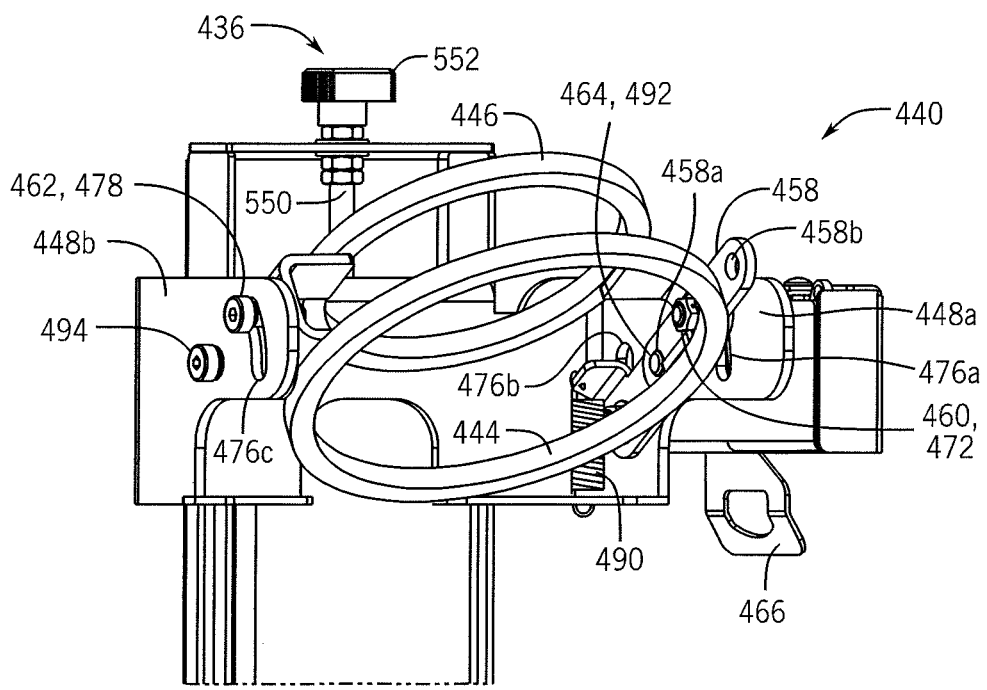
FIG. 35 is an enlarged isometric view of the halo assembly shown in FIG. 31, with the halo assembly in a third orientation.
Figure 36:
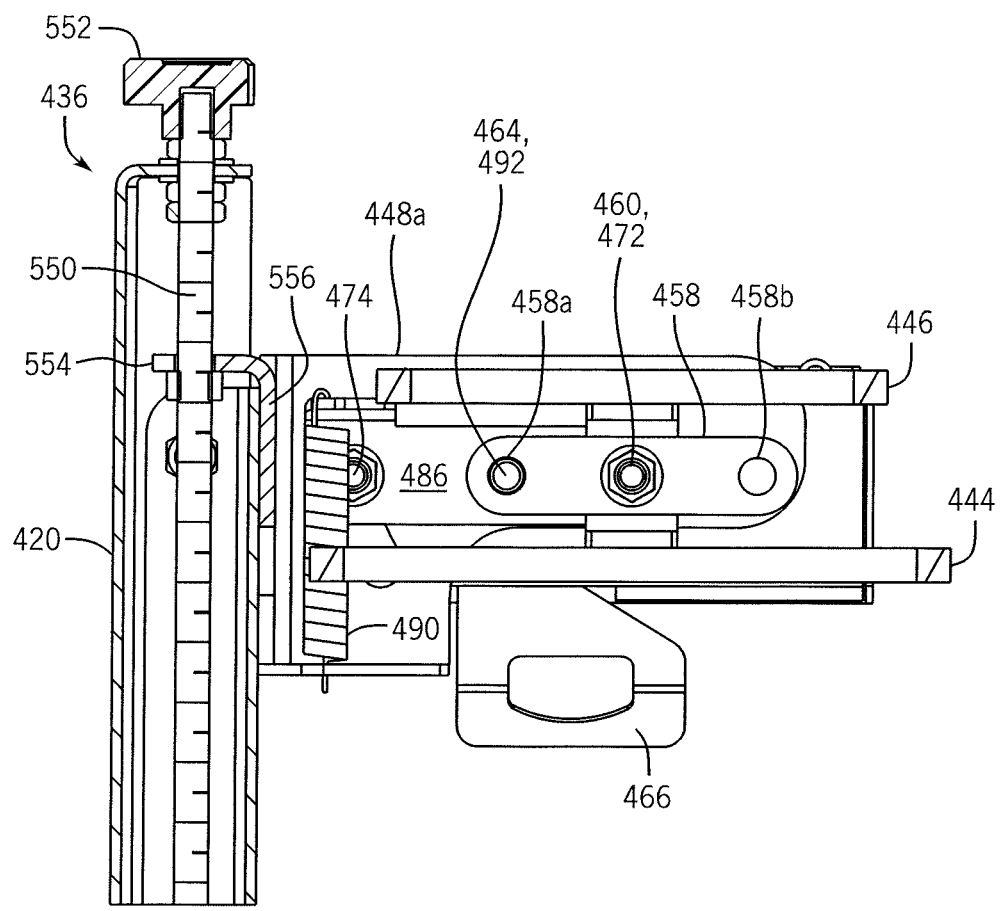
FIG. 36 is a cross-sectional view of the halo assembly shown in FIG. 31.

In some respects, the halo assembly 440 is generally similar to the halo assembly 140. For example, as illustrated in FIGS. 34-37 in particular, the illustrated embodiment of the halo assembly 440 includes two opposing tank securements configured as a first halo structure 444 and a second halo structure 446 that are generally aligned along a common central axis. The first and second halo structures 444, 446 are substantially circular with the first halo structure 444 having a larger diameter than the second halo structure 446 to generally provide the ability to secure tanks of different diameters. The first halo structure 444 and the second halo structure 446 can be formed of a polymeric or metallic material that can have a rectangular cross-section (e.g., a square cross-section as shown in FIG. 36), or can be otherwise configured. In other respects, the components and functionality of the two assemblies 140, 440 differ, including as further discussed below.

As with some other halo assemblies according to the invention, the halo assembly 440 is rotatable. In particular, the first and second halo structures 444, 446 are secured to the support assembly 334 by two opposing arms 448a, 448b that extend away from the channel 428 formed in the main support 420. A locking mechanism 456 coupled to one of the opposing arms 448a can be used to selectively secure either of the first or the second halo structures 444, 446 to engage a relevant tank.

In different embodiments, different locking mechanisms are possible. In the illustrated embodiment, for example, the locking mechanism 456 includes a first halo pivot point 460 and a second halo pivot point 462 at which the halo assembly 440 is rotatably attached to the two opposing arms 448a, 448b. A bracket 458 extends outwardly from the halo assembly 440 at the first halo pivot point 460 in two opposing directions perpendicular to the axis of the first and second halo structures 444, 446 and includes a first hole 458a and a second hole 458b at the respective distal end portions thereof. A halo pin 464, which can be biased by a spring 470 into a locking position (as shown), is removably receivable within the first and second holes 458a, 458b.

Figure 32:
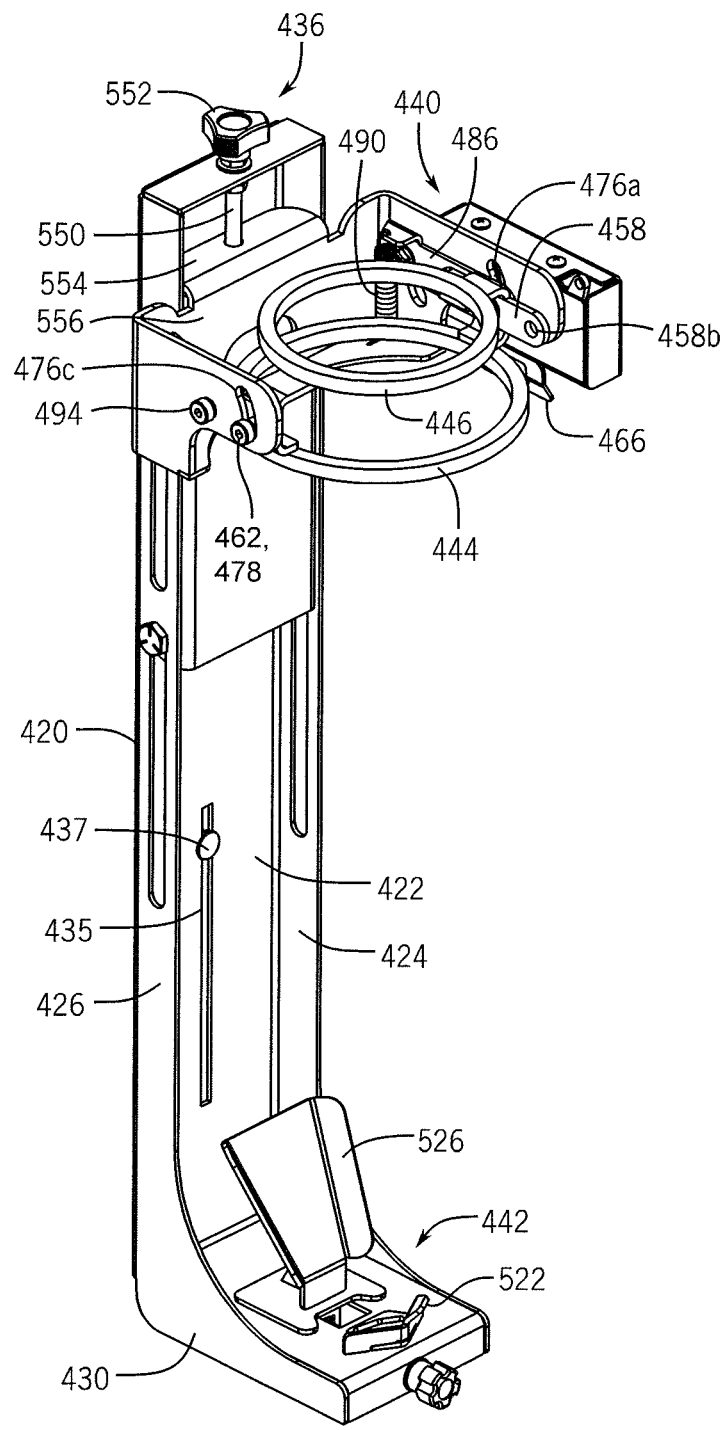
Figure 33:
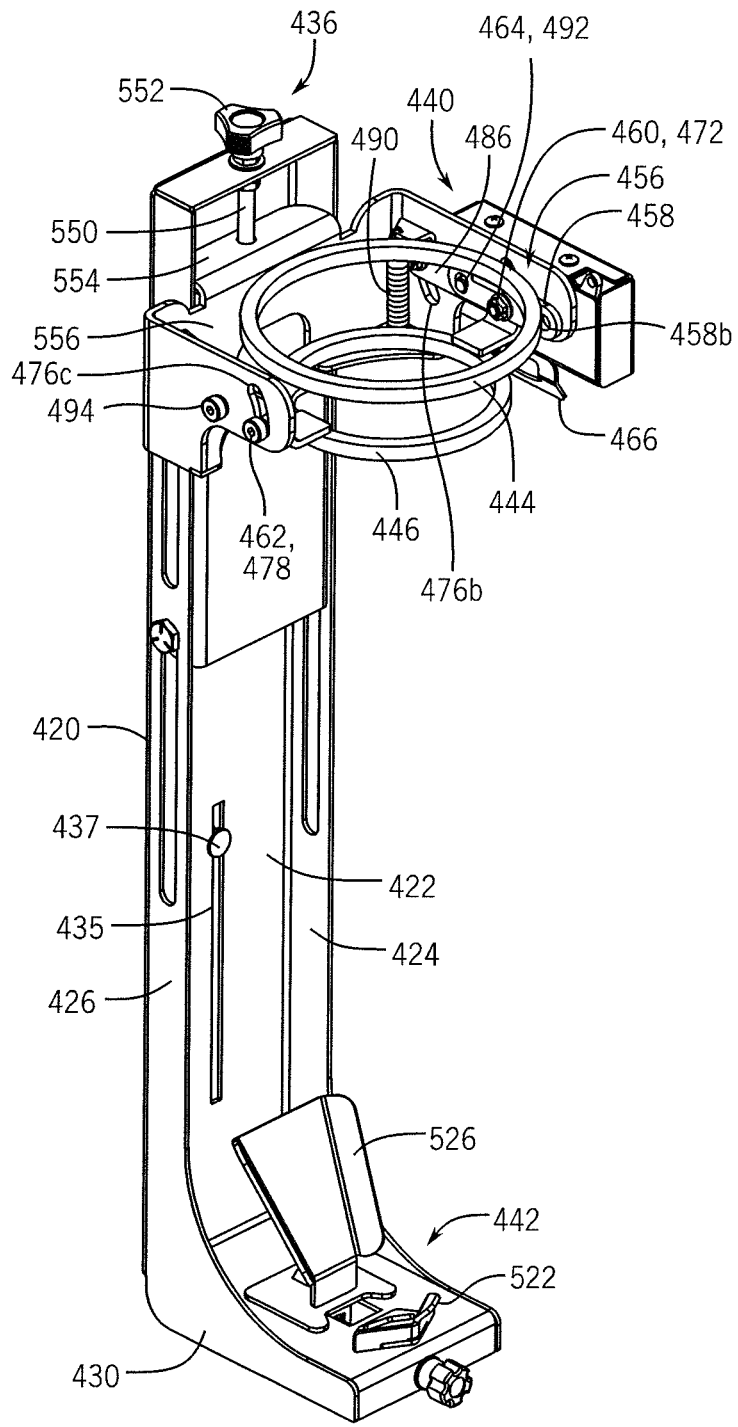
FIG. 33 is a front isometric view of the tank support assembly shown in FIG. 31, with the halo assembly in a second orientation.

To switch between the first and second halo structures 444, 446, such as from the orientation shown in FIG. 32 to the orientation shown in FIG. 33, the halo pin 464 is removed from the first hole 458a, such as by activating a lever 466 that is operatively connected to the halo pin 464 and the arm 448a. The halo assembly 440 can then rotate (e.g., by 180 degrees) at the first and second halo assembly pivot points 460, 462, to place the first halo structure 444 above the second halo structure 446 (or vice versa). The halo pin 464 can then be received within the second hole 458b (or the first hole 458a) in the bracket 458 to again lock the halo structures 444, 446 in place.

The tank support assembly 334 also includes a release system 450 to rotate the halo structures 444, 446 upwardly, such as to provide clearance between the halo assembly 440 and a tank when a user exits the emergency seat assembly 320. As detailed below, the release system 450 is configured to rotate the halo structures 444, 446 over an arcuate path with a somewhat larger radius and at a different pivot point than the rotation to switch between the halo structures 444, 446 (e.g., as described above). This can be useful, for example, in order to provide additional space for a tank to clear the halo structures 444, 446, such as when emergency personnel are exiting the seat assembly 320.

Figure 37:
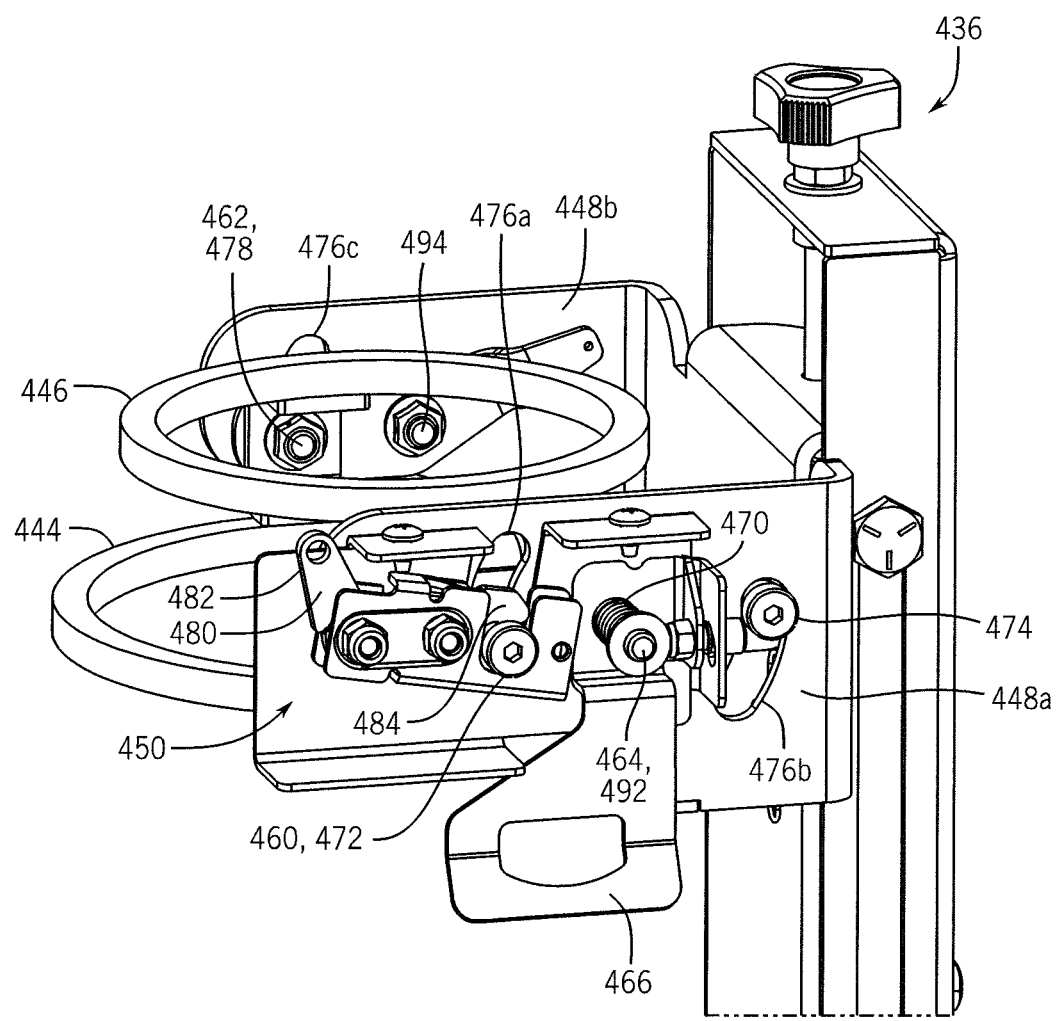
FIG. 37 is an enlarged isometric view of the halo assembly shown in FIG. 31.

The release system 450 can be seen in FIGS. 36 and 37 in particular and includes a release member 480 (see FIG. 37), a release bracket 486 (see FIG. 36), and a biasing member 490 (see FIG. 36). The release bracket 486 has a first stud 472 and a second stud 474 that extend in the same direction from the bracket 486 and are receivable within respective, opposing arcuate tracks 476a, 476b (see FIG. 37) in one opposing arm 448a. Further, a third stud 478, corresponding to the second halo assembly pivot point 462 and radially opposed to the first stud 472 is received within an arcuate track 476c in the other opposing arm 448b. The release bracket 486 also has an aperture positioned between the first and second studs 472, 474 through which a first release pivot pin 492 is received. A second release pivot pin 494 is provided on the opposing arm 448b. Thus, the release bracket 486, along with the halo structures 444, 446 collectively are configured to pivot about the release pivot pins 492, 494, as guided by movement of the studs 472, 474 within the arcuate tracks 476a, 476b.

As shown in the illustrated embodiment, the first stud 472 of the halo release mechanism 450 (i.e., a guiding pin for collective pivoting of release bracket 486 and the halo structures 444, 446) is also the first halo pivot point 460 of the locking mechanism 456 (i.e., the pivot point for switching between the halo structures 444, 446). Similarly, the first release pivot pin 492 (i.e., the pin that is actuated to release the halo structures 444, 446 for switching rotation) is also the halo pin 464 of the locking mechanism 456 (i.e., the pivot point for collective rotation of release bracket 486 and the halo structures 444, 446). This may be useful, for example, to provide a more compact overall assembly, as well as to provide overlapping but non-concentric rotation for the halo structures 444, 446 and the release bracket 486, such as may enable appropriate ranges of motion for the halo structures 444, 446 for switching and release operations within a limited spatial envelope. In other embodiments, however, other configurations are possible. For example, in some embodiment, track-guided pins for rotation of a release bracket may be differently located than pivot points for a set of halo structures.

The biasing member 490 extends between an anchor point on the opposing arm 448*a* and the release bracket 486 to bias the rear of the release bracket 486 generally downwards and, correspondingly, to bias the front of the release bracket 486 and the halo structures 444, 446 generally upwards. And the release member 480 is operatively connected at a first end 482 to a release trigger (e.g., through a wire) and is releasably engaged at a second end with the first stud 472. Accordingly, when the release trigger is activated, whether manually or otherwise, the release member 480 rotates out of the way of the first stud 472. This release of the first stud 472 by the release member 480 then allows the biasing member 490 to cause the release bracket 486 and the halo structures 444, 446 to rotate about the first release pivot pin 492 and the second release pivot pin 494. As a result, the halo structures 444, 446 can tilt upwards as guided by the arcuate tracks 476*a*, 476*b*, 476*c*, such as shown in FIG. 35, in order to release a tank (not shown in FIG. 35). In this regard, for example, the amount of rotation of the halo assembly 440 is limited by the length of the arcuate tracks 476*a*, 476*b*, 476*c* in the opposing arms 448*a*, 448*b*.

Figure 34:
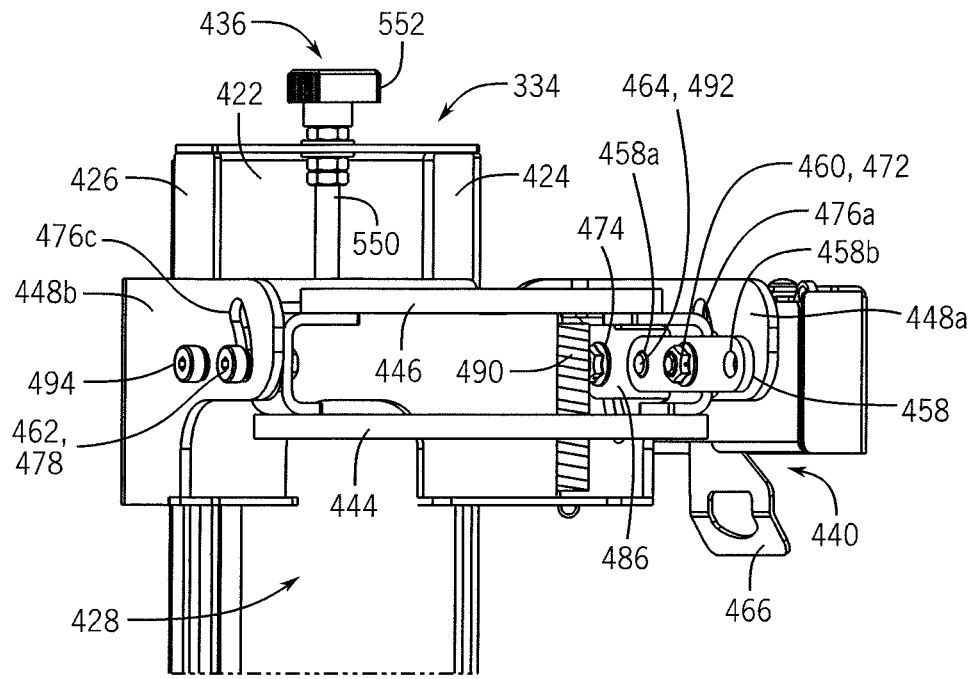
FIG. 34 is an enlarged isometric view of the halo assembly shown in FIG. 31.

Further, due to the bias of the biasing member 490, the halo structures 444, 446 may tend remain canted (e.g., tilted upwardly) until, for example, a tank being seated within the tanks support assembly 334 (e.g., by a returning emergency worker) contacts the halo structures 444, 446 to rotate the halo structures 444, 446 back to a locking orientation (e.g., as in FIG. 34). The release member 480 can then re-engage the first stud 472 (e.g., automatically) to oppose the action of the biasing member 490 and thereby again secure the halo structures 444, 446 against rotation.

In some embodiments, a release mechanism to permit or prevent rotation of a halo assembly can be configured differently than the release mechanism 450. For example, a release member can sometimes be actuated via movement or forces applied in a different direction or with a different mechanism than shown for the release mechanism 450. Likewise, in some embodiments, a halo assembly can rotate differently than illustrated, including by different maximum degrees or with different arrangements of pivot points, holes, slots, and so on. Similarly, for example, other structures to guide appropriate rotation can be provided, including more or fewer arcuate tracks, guide bearings, or other components.

In the illustrated embodiment, the halo assembly 440 can also be adjusted vertically relative to the main support 420, such as with the height adjustment assembly 436, as shown in FIG. 36. In the example configuration shown, a threaded rod 550 is coupled to a knob 552, and is operatively engaged with a bracket 554 coupled to a support member 556 that extends between the two opposing arms 448*a*, 448*b*. It is contemplated that the bracket 554 and the support member 556 can be formed from one piece (as shown here) or multiple pieces, as with various other structural components herein. Via engagement of the threaded rod 550 with a nut secured to the bracket 554 (or otherwise), turning the knob 552 in either direction rotates the threaded rod 550 relative to (and within) the bracket 554 and thereby moves the halo assembly 440 up or down relative to the threaded rod 550 and the main support 420.

In other embodiments, other adjustment mechanisms are possible. For example, in some configurations a seat assembly similar to the seat assembly 320 can include a height adjustment assembly with a gas spring arrangement similar to the height adjustment assembly 136 (see, e.g., FIG. 16). As another example, in some embodiments, a tracked adjustment assembly can be used, such as an assembly similar to the assemblies for adjusting the base seats 22, 322 (as discussed above).

Figure 38:
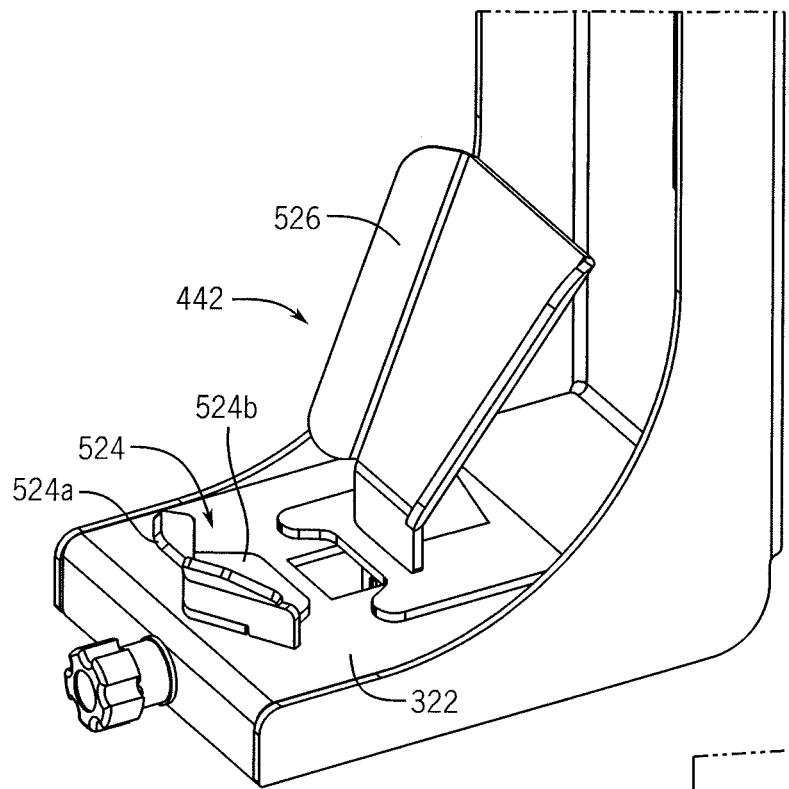
FIGS. 38 and 39 are enlarged isometric views of a tank clamp assembly of the tank support assembly shown in FIG. 31.
Figure 39:
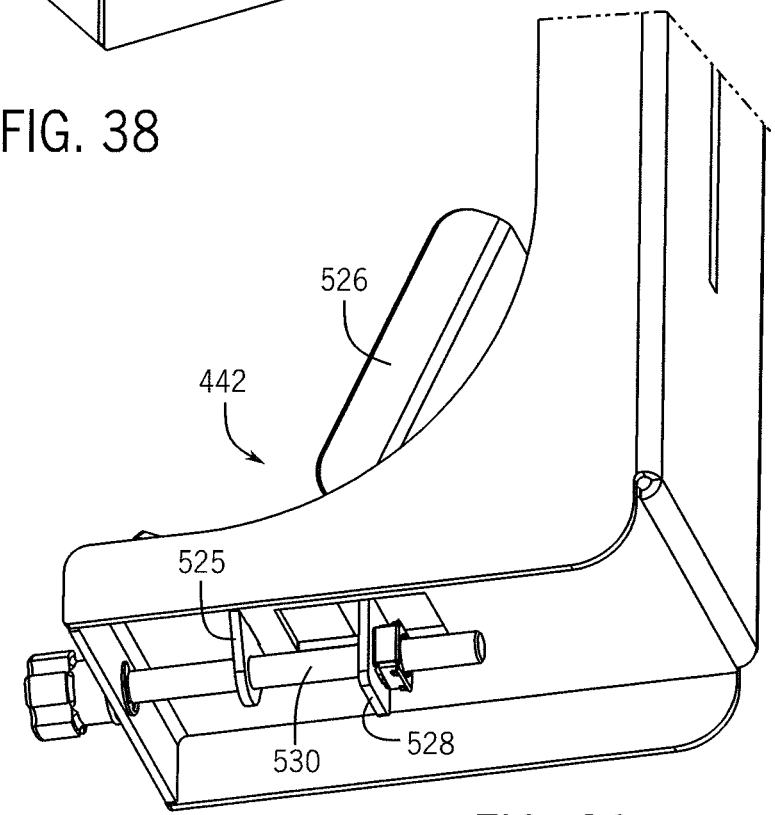

As illustrated in FIGS. 38 and 39, the emergency seat assembly 320 also includes a tank clamp assembly 442. In many respects the tank clamp assembly 442 is similar to the tank clamp assembly 142 described above and similar numbering in the 500 series is used for the tank clamp assembly 442. In some aspects, however, the tank clamp assemblies 142, 442 differ from each other. For example, a movable foot clamp 526 is generally larger than the foot clamp 226 (see FIG. 18), which can provide a bigger contact area to guide a tank into place within the tank clamp assembly 442. The movable foot clamp 526 also has an actuator engagement section 528, formed as a rigid plate with a cage nut, that extends below the base seat 322 and is configured to engage with a linear actuator 530 for sliding adjustment of the foot clamp 526.

Further, a fixed foot clamp 524 opposing the movable foot clamp 526 comprises an upper portion 524*a* and a lower portion 524*b*. The upper portion 524*a* is shaped to guide a tank into position and the lower portion 524*b* provides a contact surface to secure the tank, in cooperation with a lower portion of the foot clamp 526. It is contemplated that the upper portion 524*a* and the lower portion 524*b* of the fixed foot clamp 524 can formed from one piece or multiple pieces, and, similarly, the movable foot clamp 526 can also be formed as one or multiple pieces.

Thus embodiments of the invention can provide improvements in comfort, utility, and customizability of seats for emergency vehicles. For example, some embodiments can provide, in different combinations, linked sliding and reclining adjustability of base seats and backrests, secure but easily removable seat pads, adjustable headrests, and adaptable and intuitive assemblies to secure tanks of different sizes.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A seat assembly for a cab of an emergency vehicle configured to retain a Self-Contained Breathing Apparatus (SCBA) tank, the seat assembly comprising:
   a frame configured to be secured within the cab of the emergency vehicle proximate
   a seat support structure; and a tank securing assembly with a first tank securement and a second tank securement configured, respectively, to separately engage SCBA tanks of a first size and a second size;

the tank securing assembly being configured to be selectively rotated to a first orientation and a second orientation;

the first orientation of the tank securing assembly disposing the first tank securement to secure the SCBA tank of the first size to the frame;

the second orientation of the tank securing assembly disposing the second tank securement to secure the SCBA tank of the second size to the frame; and the tank securing assembly being further configured to rotate between a released orientation and a locked orientation and being biased toward the released orientation.

2. The seat assembly of claim 1, wherein the first tank securement and the second tank securement are rotatable together about a first pivot point between the first orientation and the second orientation; and wherein the first tank securement and the second tank securement are rotatable together about a second pivot point between the released orientation and the locked orientation.

3. The seat assembly of claim 2, wherein the rotation of the first tank securement and the second tank securement together about the first pivot point is non-concentric to the rotation of the first tank securement and the second tank securement together about the second pivot point.

4. The seat assembly of claim 1, wherein the tank securing assembly is coupled to a carriage that is vertically adjustable relative to the frame.

5. The seat assembly of claim 1, wherein the first tank securement and the second tank securement include a first halo structure and a second halo structure, respectively.

6. The seat assembly of claim 5, wherein openings of the first halo structure and the second halo structure to receive the SCBA tanks for the first and second sizes are aligned along a common axis.

7. The seat assembly of claim 5, wherein a profile of each of the first halo structure and the second halo structure includes a circular portion.

8. The seat assembly of claim 7, wherein the first halo structure and the second halo structure are fully circular.

9. The seat assembly of claim 7, wherein a profile of the first halo structure or the second halo structure includes at least one portion that deviates from the circular portion.

10. The seat assembly of claim 1, wherein the tank securing assembly remains in either the first orientation or the second orientation during the rotation between the released orientation and the locked orientation.

11. The seat assembly of claim 1, wherein when the tank securing assembly is in the first orientation, the first tank securement engages the SCBA tank of the first size without the second tank securement engaging the SCBA tank of the first size; and wherein when the tank securing assembly is in the second orientation, the second tank securement engages the SCBA tank of the second size without the first tank securement engaging the SCBA tank of the second size.

12. An assembly for a cab of an emergency vehicle configured to retain a breathing tank within the cab, the assembly comprising:

a frame configured to be secured within the cab of the emergency vehicle adjacent to a seat of the cab;

a halo assembly with a first halo structure and a second halo structure configured, respectively, to separately engage first or second breathing tanks of a first size and a second size, respectively;

the halo assembly being selectively rotatable relative to the frame between a first orientation and a second orientation, the first orientation of the halo assembly disposing the first halo structure to secure the first breathing tank to the frame and the second orientation of the halo assembly disposing the second halo structure to secure the second breathing tank to the frame; and the first halo structure and the second halo structure being supported on a first bracket that is rotatably coupled to a second bracket connected to the frame to rotate the first and second halo structures relative to the frame between a locking orientation, to secure the first or second breathing tank to the frame, and a release orientation, to release the first or second breathing tank from the frame; and the first and second halo structures being coupled together by a third bracket that is rotatably coupled to the first bracket to rotate the halo assembly between the first orientation and the second orientation.

13. The assembly of claim 12, wherein a profile of the first halo structure includes a first circular portion and a profile of the second halo structure include a second circular portion, wherein the first circular portion defines a first diameter and the second circular portion defines a second diameter that is different than the first diameter.

14. The assembly of claim 12, wherein the first halo structure and the second halo structure are concentrically aligned along a common axis.

15. The assembly of claim 12, wherein the first bracket is spring-biased toward the release orientation.

16. The assembly of claim 12, wherein the third bracket is rotatably secured to the first bracket to selectively rotate the first and second halo structures together about a first axis, between the first orientation and the second orientation; and wherein the first bracket is rotatably secured to one or more arms of the second bracket to rotate the first and second halo structures together about a second axis, between the locking orientation and the release orientation.

17. The assembly of claim 16, wherein the second bracket includes one or more arcuate slots spaced apart from the second axis to guide and limit the rotation of the first bracket.

18. The assembly of claim 16, wherein the first bracket and the third bracket include apertures configured to be selectively aligned to lock the first and second halo structures in the first orientation or the second orientation.

19. A method of retaining a breathing tank relative to a seat assembly for a cab of an emergency vehicle, the method comprising:

rotating a bracket that supports a first halo structure and a second halo structure of a tank securing assembly relative to the seat assembly to collectively rotate the first and second halo structures between a first orientation or a second orientation, to selectively align the first halo structure or the second halo structure to engage breathing tanks of a first size or a second size, respectively; and locking the tank securing assembly with the first and second halo structures collectively in either of the first orientation or the second orientation to selectively configure the tank securing assembly to secure either of a first breathing tank of the first size or a second breathing tank of the second size with the first halo structure or the second halo structure, respectively.

20. The method of claim 19, further comprising:

with the tank securing assembly in a released orientation, selectively aligning the first breathing tank or the second breathing tank with the tank securing assembly; and rotating the tank securing assembly, including the first halo structure and the second halo structure, from the released orientation to a locked orientation in which the first halo structure or the second halo structure is disposed to secure the first breathing tank or the second breathing tank, respectively, relative to the seat assembly.

* * * * *